(12) United States Patent
Ryhorchuk

(10) Patent No.: US 9,456,293 B2
(45) Date of Patent: Sep. 27, 2016

(54) SENSOR NODES WITH MULTICAST TRANSMISSIONS IN LIGHTING SENSORY NETWORK

(71) Applicant: Sensity Systems, Inc., Sunnyvale, CA (US)

(72) Inventor: Kent W. Ryhorchuk, Portola Valley, CA (US)

(73) Assignee: Sensity Systems Inc., Sunnyvale, CA (US)

( * ) Notice: Subject to any disclaimer, the term of this patent is extended or adjusted under 35 U.S.C. 154(b) by 87 days.

(21) Appl. No.: 14/224,300

(22) Filed: Mar. 25, 2014

(65) Prior Publication Data

US 2014/0293993 A1    Oct. 2, 2014

Related U.S. Application Data

(60) Provisional application No. 61/805,387, filed on Mar. 26, 2013.

(51) Int. Cl.
*H04W 4/00* (2009.01)
*H04L 29/08* (2006.01)
(Continued)

(52) U.S. Cl.
CPC .............. *H04W 4/006* (2013.01); *H04L 67/12* (2013.01); *H04L 69/28* (2013.01); *H04L 12/1895* (2013.01); *H04W 84/18* (2013.01)

(58) Field of Classification Search
USPC ......... 370/328, 329, 350, 503–520; 709/203, 709/208, 224
See application file for complete search history.

(56) References Cited

U.S. PATENT DOCUMENTS 4,384,288 A    5/1983  Walton
5,161,107 A   11/1992  Mayeaux et al.
(Continued)

FOREIGN PATENT DOCUMENTS

CA    2690148 A    12/2008
CN    102110376 B   11/2012
(Continued)

OTHER PUBLICATIONS

International Search Report, International Application No. PCT/US2013/045407, dated Sep. 23, 2013.
(Continued)

*Primary Examiner* — Hanh N Nguyen
*Assistant Examiner* — Jose Perez
(74) *Attorney, Agent, or Firm* — Schwegman Lundberg & Woessner, P.A.

(57) ABSTRACT

An embodiment method for communicating data within a lighting sensory network may include configuring a first plurality of lighting nodes to operate as sensor nodes, configuring a second plurality of lighting nodes to operate as listening nodes, generating, by a sensor node using an encryption key, a sensor message associated with sensor data and including at least a timestamp, calculating an interval for transmitting the sensor message, wherein the interval is randomized and exponentially increasing, determining whether to transmit the sensor message based on the calculated interval, transmitting the sensor message in response to determining to transmit the sensor message based on the calculated interval, receiving, by a listening node, the sensor message at a listening node, determining whether the received sensor message is useful based on the timestamp and a predefined age threshold, and performing a lighting action in response to determining the received sensor message is useful.

23 Claims, 12 Drawing Sheets

(51) Int. Cl.
  *H04L 29/06* (2006.01)
  *H04W 84/18* (2009.01)
  *H04L 12/18* (2006.01)

(56) References Cited

U.S. PATENT DOCUMENTS

| | | |
|---|---|---|
| 5,793,491 A | 8/1998 | Wangler et al. |
| 6,118,230 A | 9/2000 | Fleischmann |
| 6,364,253 B1 | 4/2002 | Cavanagh |
| 6,608,453 B2 | 8/2003 | Morgan et al. |
| 6,683,539 B2 | 1/2004 | Trajkovic et al. |
| 6,696,945 B1 | 2/2004 | Venetianer et al. |
| 6,961,313 B1* | 11/2005 | Gaspar ............ 370/242 |
| 6,970,083 B2 | 11/2005 | Venetianer et al. |
| 6,999,882 B2 | 2/2006 | Frie et al. |
| 7,304,727 B2 | 12/2007 | Chien et al. |
| 7,333,903 B2 | 2/2008 | Walters et al. |
| 7,583,815 B2 | 9/2009 | Zhang et al. |
| 7,613,324 B2 | 11/2009 | Venetianer et al. |
| 7,613,590 B2 | 11/2009 | Brown |
| 7,674,018 B2 | 3/2010 | Holder et al. |
| 7,688,225 B1 | 3/2010 | Haynes et al. |
| 7,817,063 B2 | 10/2010 | Hawkins et al. |
| 7,825,602 B2 | 11/2010 | Hu et al. |
| 7,868,912 B2 | 1/2011 | Venetianer et al. |
| 7,891,004 B1* | 2/2011 | Gelvin ............ H04L 67/12 701/24 |
| 7,925,249 B2 | 4/2011 | Funk et al. |
| 7,925,384 B2 | 4/2011 | Huizenga et al. |
| 7,932,923 B2 | 4/2011 | Lipton et al. |
| 7,983,685 B2 | 7/2011 | Silverstrim et al. |
| 7,986,339 B2 | 7/2011 | Higgins |
| 8,027,809 B2 | 9/2011 | Brown |
| 8,049,592 B2 | 11/2011 | Wang et al. |
| 8,073,554 B2 | 12/2011 | Vezza et al. |
| 8,078,431 B2 | 12/2011 | Brown |
| 8,095,340 B2 | 1/2012 | Brown |
| 8,111,018 B2 | 2/2012 | You |
| 8,147,267 B2 | 4/2012 | Oster |
| 8,244,260 B2 | 8/2012 | Silverstrim et al. |
| 8,285,986 B2 | 10/2012 | Shon et al. |
| 8,306,051 B2 | 11/2012 | Stocker |
| 8,334,901 B1 | 12/2012 | Ganick et al. |
| 8,334,906 B2 | 12/2012 | Lipton et al. |
| 8,436,542 B2 | 5/2013 | Middleton-White et al. |
| 8,438,175 B2 | 5/2013 | Papke et al. |
| 8,441,397 B2 | 5/2013 | Binzer et al. |
| 8,461,963 B2 | 6/2013 | Ko et al. |
| 8,464,182 B2 | 6/2013 | Blumenberg et al. |
| 8,493,209 B2 | 7/2013 | Mohan et al. |
| 8,510,550 B2 | 8/2013 | Westhoff et al. |
| 8,514,082 B2 | 8/2013 | Cova et al. |
| 8,522,029 B2 | 8/2013 | Agrawal et al. |
| 8,531,134 B2 | 9/2013 | Chemel et al. |
| 8,532,962 B2 | 9/2013 | Zhang et al. |
| 8,533,491 B2 | 9/2013 | Klein |
| 8,542,130 B2 | 9/2013 | Lavoie |
| 8,558,889 B2 | 10/2013 | Martin et al. |
| 8,560,357 B2 | 10/2013 | Sickenius |
| 8,564,661 B2 | 10/2013 | Lipton et al. |
| 8,575,861 B1 | 11/2013 | Gordin et al. |
| 8,582,816 B2 | 11/2013 | Lee et al. |
| 8,587,225 B2 | 11/2013 | Ashar et al. |
| 8,590,011 B1 | 11/2013 | Legault et al. |
| 8,594,482 B2 | 11/2013 | Fan et al. |
| 8,607,341 B2 | 12/2013 | Yoon et al. |
| 8,619,079 B2 | 12/2013 | Peterson et al. |
| 8,619,549 B2 | 12/2013 | Narayana et al. |
| 8,635,049 B2 | 1/2014 | Kauffman et al. |
| 8,732,031 B2 | 5/2014 | Martin et al. |
| 2002/0163933 A1* | 11/2002 | Benveniste ............ 370/465 |
| 2003/0102979 A1* | 6/2003 | Jednacz et al. ........ 340/825.52 |
| 2003/0222587 A1 | 12/2003 | Dowling et al. |
| 2004/0124338 A1 | 7/2004 | Cloutier et al. |
| 2007/0234036 A1* | 10/2007 | Tan et al. ............ 713/154 |
| 2007/0294393 A1* | 12/2007 | Smith et al. ............ 709/224 |
| 2008/0215391 A1 | 9/2008 | Dowling et al. |
| 2009/0026966 A1* | 1/2009 | Budde et al. ............ 315/152 |
| 2009/0262189 A1 | 10/2009 | Marman |
| 2009/0278479 A1* | 11/2009 | Platner et al. ............ 315/312 |
| 2009/0299527 A1 | 12/2009 | Huizenga et al. |
| 2009/0307255 A1 | 12/2009 | Park |
| 2010/0001652 A1 | 1/2010 | Damsleth |
| 2010/0228601 A1 | 9/2010 | Vaswani et al. |
| 2010/0302779 A1* | 12/2010 | Chemel ............ H05B 37/029 362/249.02 |
| 2011/0001438 A1* | 1/2011 | Chemel ............ H05B 37/029 315/297 |
| 2011/0002324 A1* | 1/2011 | Falck et al. ............ 370/350 |
| 2011/0066297 A1* | 3/2011 | Saberi et al. ............ 700/287 |
| 2011/0158410 A1* | 6/2011 | Falk et al. ............ 380/270 |
| 2012/0002406 A1 | 1/2012 | Leadford et al. |
| 2012/0038281 A1* | 2/2012 | Verfuerth ............ 315/152 |
| 2012/0040606 A1 | 2/2012 | Verfuerth |
| 2012/0044350 A1 | 2/2012 | Verfuerth |
| 2012/0068608 A1 | 3/2012 | Covaro et al. |
| 2012/0086561 A1 | 4/2012 | Ilyes et al. |
| 2012/0130544 A1 | 5/2012 | Mohan et al. |
| 2012/0130774 A1 | 5/2012 | Ziv et al. |
| 2012/0143357 A1 | 6/2012 | Chemel et al. |
| 2012/0146518 A1 | 6/2012 | Keating et al. |
| 2012/0262093 A1* | 10/2012 | Recker et al. ............ 315/308 |
| 2012/0310984 A1 | 12/2012 | Branson et al. |
| 2013/0010251 A1 | 1/2013 | Croft et al. |
| 2013/0013091 A1 | 1/2013 | Cavalcanti et al. |
| 2013/0073192 A1 | 3/2013 | Hota et al. |
| 2013/0088168 A1 | 4/2013 | Mohan et al. |
| 2013/0107041 A1 | 5/2013 | Norem et al. |
| 2013/0134886 A1 | 5/2013 | Golding et al. |
| 2013/0158952 A1 | 6/2013 | Liebel et al. |
| 2013/0159454 A1 | 6/2013 | Hunter et al. |
| 2013/0211613 A1 | 8/2013 | Praske et al. |
| 2013/0221203 A1 | 8/2013 | Barrilleaux |
| 2013/0227569 A1 | 8/2013 | Kohli et al. |
| 2013/0229804 A1 | 9/2013 | Holder et al. |
| 2013/0265563 A1 | 10/2013 | Vogt et al. |
| 2013/0297212 A1 | 11/2013 | Ramer et al. |
| 2013/0342355 A1 | 12/2013 | Lund et al. |
| 2013/0346229 A1 | 12/2013 | Martin et al. |

FOREIGN PATENT DOCUMENTS

| | | |
|---|---|---|
| CN | 102867386 A | 1/2013 |
| CN | 20293979 U | 5/2013 |
| CN | 105264831 A | 1/2016 |
| EP | 1658579 A1 | 5/2006 |
| EP | 2581888 A1 | 4/2013 |
| EP | 2660625 A1 | 11/2013 |
| EP | 2709428 A2 | 3/2014 |
| KR | 10-2007-0044243 A | 4/2007 |
| KR | 10-0760535 B1 | 9/2007 |
| KR | 10-0784836 B1 | 12/2007 |
| KR | 2010-0136186 | 12/2010 |
| KR | 2011-0017037 | 2/2011 |
| KR | 2011-0055807 A | 5/2011 |
| KR | 20120105642 A | 9/2012 |
| KR | 20130044925 A | 3/2013 |
| WO | WO03055734 A1 | 7/2003 |
| WO | WO2008008505 A2 | 1/2008 |
| WO | WO2008085815 A1 | 7/2008 |
| WO | WO2009076182 A1 | 6/2009 |
| WO | WO-2010123708 A1 | 10/2010 |
| WO | WO2011041903 A1 | 4/2011 |
| WO | WO2011/053969 A2 | 5/2011 |
| WO | WO2011121470 A1 | 10/2011 |
| WO | WO 2011132013 A1 * | 10/2011 |
| WO | WO2012042432 A1 | 4/2012 |
| WO | WO2012092150 A2 | 7/2012 |
| WO | WO2012140152 A1 | 10/2012 |
| WO | WO2013131189 A1 | 9/2013 |

(56) References Cited

FOREIGN PATENT DOCUMENTS

| WO | WO2013165777 A1 | 11/2013 |
| WO | WO-2014160708 | 1/2014 |

OTHER PUBLICATIONS

International Search Report, International Application No. PCT/US2013/037968, dated Jul. 2, 2013.

Korean Intellectual Property Office, Korean Application No. 10-2013-0109844, Office Action issued Jul. 24, 2014.

International Search Report, International Application No. PCT/US2014/031723, dated Jul. 7, 2014.

J. Xu et al., "Distance Measurement Model Based on RSSI in WSN," Wireless Sensor Network, 2010, 2, 606-611.

D. Munoz et al., "Position Location Techniques and Applications," Academic Press, 2009.

"International Application Serial No. PCT/US2013/037968, International Search Report mailed Jul. 2, 2013", 2 pgs.

International Application Serial No. PCT/US2014/031723, International Preliminary Report on Patentability mailed Oct. 8, 2015, 7 pgs.

\* cited by examiner

Lighting sensory network
Listening Node Stored Data

800 →

| Rx Port 802 | Rx Key 804 | Msg max 806 | Msg Age 808 | Distance-enabled 810 | Max Distance XY 812 | Max Distance Z 814 | Position (X, Y, Z) 816 |
|---|---|---|---|---|---|---|---|

FIG. 8

```
Initialize linked list L = { }; //empty
Set L.messages_max = M;
Set L.messages_sort_type = 'newest-to-oldest';

While (receiving message m)
{
        //check the timestamps to ignore messages based on age thresholds
        If (m.timestamp < current_time - Te)
        {
                Discard m;
                Continue;
        }

If (m.timestamp > current_time + Td)
        {
                Discard m;
                Continue;
        }

//check for distance to ignore message from too far away
        If (distance_enabled)
        {
                If(get_xydistance(m.pos, self.pos) > max_distance_xy)
                {
                        Discard m;
                        Continue;
                }

If (get_zdistance(m.pos, self.pos) > max_distance_z)
                {
                        Discard m;
                        Continue;
                }
        }

If (L.full()) //is the list of stored messages full?
        {
                //get oldest stored message for removal.
                message mm = L.get_oldest_message();

If (m.timestamp > mm.timestamp)
                {
                        Discard m;
                        Continue;
                }
                Else
                {       L.remove(mm);
                        L.insert(m); //insert message
                }
        }
        Else
        {       L.insert(m); //insert message and maintain ordering;}
}// end of while receiving messages
```

SENSOR NODES WITH MULTICAST TRANSMISSIONS IN LIGHTING SENSORY NETWORK

RELATED APPLICATIONS

The present application claims the benefit of priority to U.S. Provisional Application No. 61/805,387, entitled "Sensor Nodes with Multicast Broadcasting" filed Mar. 26, 2013, the entire contents of which are hereby incorporated by reference.

BACKGROUND

This document describes a general purpose sensor transmitting mechanism used in the light sensory network.

SUMMARY

Various embodiments include methods, systems, devices, and non-transitory processor-readable storage media for communicating data within a lighting sensory network. An embodiment method may include operations for generating, by the lighting node, using an encryption key a sensor message associated with sensor data, wherein the sensor message may include at least a timestamp related to a first time, calculating, by the lighting node, an interval for transmitting the generated sensor message, wherein the interval may be randomized and exponentially increasing, determining, by the lighting node, whether to transmit the generated sensor message at a second time based on the calculated interval, and transmitting, by the lighting node, the generated sensor message at the second time in response to determining to transmit the generated sensor message based on the calculated interval. In some embodiments, the method may also include receiving, at the lighting node, a message from a server that assigns the lighting node to a sensor node group for transmitting sensor messages using transmission parameters, wherein the received message may include at least the encryption key and clock synchronization information, obtaining, by the lighting node, the sensor data at the first time from one or more sensors coupled to the lighting node, and synchronizing, by the lighting node, a local clock mechanism based on the clock synchronization information, and wherein transmitting, by the lighting node, the generated sensor message at the second time in response to determining to transmit the generated sensor message based on the calculated interval may include transmitting, by the lighting node, the generated sensor message at the second time using the transmission parameters from the received message in response to determining to transmit the generated sensor message based on the calculated interval. In some embodiments, the lighting node may be capable of being configured to transmit and/or receive the sensor messages. In some embodiments, generating, by the lighting node, the sensor message using the encryption key may include using AES-128-CBC. In some embodiments, the generated sensor message may further include one or more of nonce data, version data, sensor identifier data, debugging identifier data, the sensor data, and position data related to the lighting node. In some embodiments, calculating, by the lighting node, the interval for transmitting the generated sensor message may include calculating the interval using an equation, wherein the equation is $B*2^n*random()$, wherein B may be a base retransmission interval, n may be one of a number of retransmissions for the generated sensor message or a default number, and random( ) may be a function that returns a random number. In some embodiments, transmitting, by the lighting node, the generated sensor message at the second time using the transmission parameters may include transmitting the generated sensor message on a UDP port indicated in the transmission parameters. In some embodiments, the lighting sensory network may be one of a Wi-Fi® wireless network or an ad hoc wireless network. In some embodiments, the method may further include determining, by the lighting node, whether to retransmit the generated sensor message based on at least one of a predefined age threshold and a number of previous transmissions of the generated sensor message. In some embodiments, the method may further include discarding, by the lighting node, the generated sensor message in response to determining not to retransmit the generated sensor message based on at least one of the predefined age threshold and the number of previous transmissions of the generated sensor message.

Another embodiment method for a lighting node within a lighting infrastructure to receive data from other nodes within a lighting sensory network may include operations for receiving, by the lighting node, a sensor message from a sensor node within the lighting sensory network, wherein the sensor message may be transmitted by the sensor node using an interval that may be randomized and exponentially increasing, determining, by the lighting node, whether the received sensor message may be useful based on a timestamp from the received sensor message and a predefined age threshold, and performing, by the lighting node, a lighting action based on the received sensor message in response to determining the received sensor message may be useful. In some embodiments, the method may further include receiving, at the lighting node, a message from a server that assigns the lighting node to a listening node group for receiving sensor data using receiving parameters, wherein the received message may include at least a decryption key and clock synchronization information, and synchronizing, by the lighting node, a local clock mechanism based on the clock synchronization information, and wherein receiving, by the lighting node, the sensor message from the sensor node within the lighting sensory network may include receiving, by the lighting node, the sensor message from the sensor node within the lighting sensory network using the receiving parameters from the received message, and wherein the predefined age threshold may be indicated in the receiving parameters. In some embodiments, the method may further include decrypting, by the lighting node, the received sensor message using the decryption key. In some embodiments, receiving, by the lighting node, the sensor message from the sensor node within the lighting sensory network may include monitoring a UDP port indicated in the receiving parameters. In some embodiments, the lighting sensory network may be one of a Wi-Fi® wireless network or an ad hoc wireless network. In some embodiments, the method may further include calculating, by the lighting node, a distance based on a first position indicated by the received sensor message and a second position corresponding to the lighting node, and determining, by the lighting node, whether the received sensor message may be within a predefined distance threshold based on the calculated distance, and wherein performing, by the lighting node, the lighting action based on the received sensor message in response to determining the received sensor message may be useful may include performing, by the lighting node, the lighting action based on the received sensor message in response to determining the received sensor message may be useful and in response to determining the calculated distance may be within the predefined distance threshold. In some embodiments, the lighting action may include at least one of dimming a light source, intensifying the light source, deactivating the light source, and activating the light source. In some embodiments, the method may further include determining, by the lighting node, whether a maximum number of sensor messages are stored within a local memory, discarding, by the lighting node, an oldest stored sensor message in response to determining that the maximum number of sensor messages are stored within the local memory, and storing, by the lighting node, the received sensor message in the local memory. In some embodiments, the lighting node may be capable of being configured to transmit and/or receive sensor messages.

In another embodiment method for communicating data within a lighting sensory network may include operations for configuring a first plurality of lighting nodes to operate as sensor nodes that transmit messages associated with sensor data, configuring a second plurality of lighting nodes to operate as listening nodes that receive the messages associated with the sensor data, generating, by each of one or more of the first plurality of lighting nodes, a sensor message associated with the sensor data, generated using an encryption key, and may include at least a timestamp, calculating, by each of the one or more of the first plurality of lighting nodes, an interval for transmitting the generated sensor message, wherein the interval may be randomized and exponentially increasing, determining, by each of the one or more of the first plurality of lighting nodes, whether to transmit the generated sensor message based on the calculated interval, transmitting, by each of the one or more of the first plurality of lighting nodes, the generated sensor message in response to determining to transmit the generated sensor message based on the calculated interval, receiving, by one or more of the second plurality of lighting nodes, one or more sensor messages transmitted by the one or more of the first plurality of lighting nodes, determining, by the one or more of the second plurality of lighting nodes, whether the received one or more of the sensor messages transmitted by the one or more of the first plurality of lighting nodes are useful based on timestamp data from the received one or more of the sensor messages and a predefined age threshold, and performing, by the one or more of the second plurality of lighting nodes, one or more lighting actions in response to determining the received one or more of the sensor messages transmitted by the one or more of the first plurality of lighting nodes are useful.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIG. 8 is a block diagram of an exemplary data structure for information stored within a listening node within a lighting sensory network suitable for use in various embodiments.

FIG. 9 is an exemplary pseudocode for listening nodes to handle incoming messages from sensor nodes within a lighting sensory network suitable for use in various embodiments.

DETAILED DESCRIPTION

Figure 1:
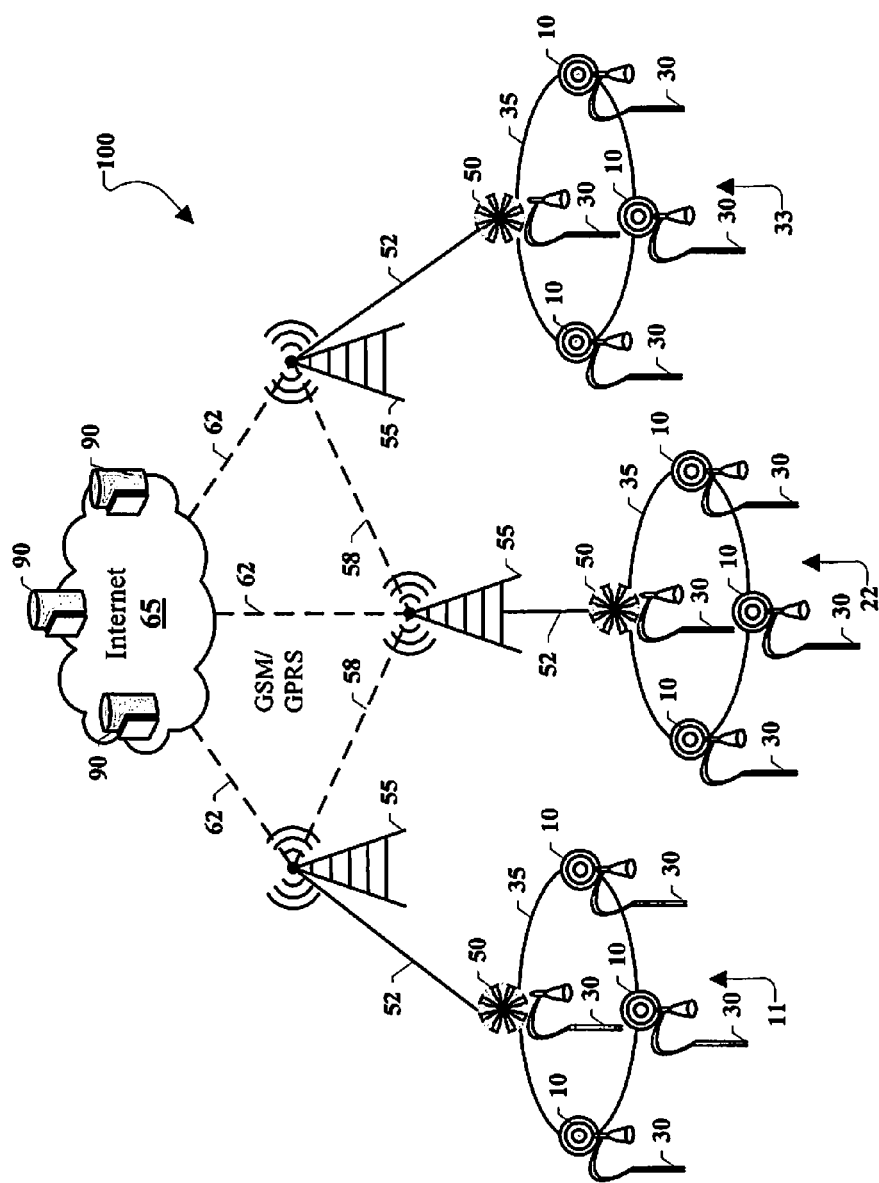
FIG. 1 is a diagram illustrating an exemplary architecture of a networked lighting sensory network suitable for use in various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "server" and "server computing device" and "coordinating server" are used to refer to any computing device capable of functioning as a server, such as a master exchange server, web server, mail server, document server, and a personal or mobile computing device configure with software to execute server functions (e.g., a "light server"). A server may be a dedicated computing device or a computing device including a server module (e.g., running an application which may cause the computing device to operate as a server). A server module (or server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a personal computing device, thereby enabling it to function as an Internet server (e.g., an enterprise e-mail server) to a limited extent, such as necessary to provide the functionality described herein.

The various embodiments provide methods, devices, systems, and non-transitory process-readable storage media for distributing or communicating data between nodes of within a lighting sensory network using a general purpose transmission mechanism (e.g., a broadcasting mechanism). Lighting nodes within the lighting sensory network may be configured to transmit data (e.g., broadcast data, etc.), receive data, or both using a shared medium, such as a Wi-Fi® wireless network or an ad hoc wireless network in which all nodes may transmit messages independently (e.g., Bluetooth®, Bluetooth® Low Energy (BTLE), ZigBee®, 802.15.4, etc.). Accordingly, some lighting nodes may be configured to transmit data (referred to herein as "sensor nodes") and may utilize various types of coupled sensors (e.g., ambient light sensors, temperature sensors, motion detectors, cameras, etc.) to gather sensor data for distribution throughout the network. Other lighting nodes (referred to herein as "listening nodes") may be configured to monitor for and receive sensor data transmitted by sensor nodes. By gathering and distributing sensor data, the various lighting nodes of the lighting sensory network may enable lighting actions to be performed in response to events detected within installation sites (e.g., parking garages, etc.). For example, the light intensity of a light bulb at a listening node may be dimmed or intensified in response to a message from a sensor node indicating a motion event was detected within a parking garage.

Sensor nodes within sensor node groups may be configured to periodically transmit (e.g., broadcast) sensor messages that include sensor data and other information that may be received by listening nodes within the network. For example, each time a sensor node detects an event, such as motion detection, it may broadcast a sensor message on the network that indicates which sensor detected or generated the event and at what time (i.e., a timestamp) the event occurred. In some embodiments, sensor nodes may transmit sensor message to a destination user datagram protocol (UDP) port indicated by a coordinating server. However, to ensure reliable communication and network robustness, sensor nodes may retransmit sensor messages multiple times. In particular, sensor messages may be retransmitted with randomized exponentially increasing retransmit intervals. For example, each time a particular sensor message is transmitted, a sensor node may calculate a new retransmit time that is based on and larger than a base retransmit interval (e.g., 500 ms). In this way, if original transmissions of sensor messages are not received by listening devices due to network congestion, rebooting operations, etc., the retransmissions of those sensor messages may potentially be received and used by the listening nodes instead.

In various embodiments, sensor messages transmitted by sensor nodes may include various data, including cryptographically random numbers or data (i.e., a nonce) sent as plaintext, timestamps related to the time sensor data was obtained by the sensor node, protocol versions of the message, identifying information (e.g., sensor identifier), debugging information, actual sensor data (e.g., readings, measurements from a sensor unit, etc.), position information related to the sensor node (e.g., Cartesian coordinates, 3D coordinates, etc.), etc. Sensor messages may be a predefined size (e.g., 48-bytes). Further, sensor messages may be encrypted by sensor nodes using an encryption algorithm or technique (e.g., Advanced Encryption Standard Cipher Block Chaining or "AES-128-CBC", etc.) and an encryption key provided by a coordinating server, and inversely may be decrypted by listening nodes using decryption keys also provided by the coordinating server. By utilizing large cryptographically random numbers, encryption schemes, and timestamping data, sensor messages may be secured from replay attacks.

It should be noted that timestamp data included within sensor messages transmitted by sensor nodes may be based on a synchronized clock, and further may only indicate a time when sensor data of the sensor messages was obtained. In other words, timestamp data may not indicate when sensor messages were transmitted (or re-transmitted), but instead when sensor data within the sensor messages was obtained by transmitting sensor nodes. Thus, a retransmission sensor message and its original sensor message may include the same timestamp data.

Listening nodes within listening node groups may be configured to monitor for, receive, and process sensor messages, such as by decrypting and performing operations associated with the sensor data within sensor messages. In other words, operations performed at the listening nodes may be triggered by the response of data within sensor messages transmitted by sensor nodes. For example, in response to receiving particular sensor data, listening nodes may perform lighting actions, such as adjusting lighting levels within an installation site (e.g., a parking deck, a building, etc.). As another example, a listening node may activate (or deactivate) a light source (e.g., light bulb) in response to receiving a sensor message that indicates motion was detected at a sensor node. As another example, listening nodes may turn on or increase the intensity of the light output of their light source (or light bulb) in response to receiving a sensor message including motion detector data that indicates a motion event occurred within a sensor node group. In some embodiments, listening nodes may wait for sensor message packets on a configurable UDP port (or receiving port) that is defined by receiving parameters received by the listening node from a coordinating server.

In some embodiments, the listening nodes may further utilize proximity or distance information within sensor message to adjust lighting actions performed by listening nodes. For example, the amount of dimming or increasing the intensity of a light may depend upon the distance between a listening node and the sensor node that transmitted a sensor message causing the lighting action. In some embodiments, lighting nodes may be configured to perform operations in response to determining certain statistics based on stored sensor message, such as by behaving in certain ways in response to identifying max, average, min, etc. attributes for sensor messages received at the listening nodes.

In some embodiments, when sensor data is ambient light sensor readings, listening nodes may decide to adjust their light output based on a daylight harvesting algorithm. Since all the listening nodes in a listening node group may have similar or identical lists of sensor data, they may appear to act in unison despite the lack of centralized control.

In some embodiments, listening nodes within a listening node group may be configured to all turn on simultaneously or within a close time window in response to receiving particular sensor messages that cause listening nodes to activate their lights. For example, in the worst case with no network faults, all lights (or bulbs) of such listening nodes may be activated in less than a few seconds (e.g., 10 seconds) from the receipt of a particular sensor message from a sensor node. As another example, when listening nodes are rebooting or having other problems, all lights coupled to listening nodes in a listening node group may turn on in less than 60 seconds.

Sensor data or other data or events indicated within sensor messages may only be relevant for a limited amount of time (e.g., 30 seconds, etc.). Therefore, listening nodes may include logic or other circuitry to determine whether data within sensor messages is relevant and capable of triggering a predetermined action, or whether the data is not useful (e.g., too old, etc.) and thus may be discarded. For example, a listening node may turn a light off in response to determining a triggering motion event is no longer valid due to being associated with a timestamp older than a predefined age threshold. Accordingly, listening nodes may evaluate timestamp information associated with received sensor messages to identify whether related sensor data was obtained within predefined age thresholds (e.g., 30 seconds old). When sensor messages having timestamps that are outside of age thresholds are received, listening nodes may discard these sensor messages. For example, received sensor messages that are too old or include a timestamp that is too far in the future may be discarded by listening nodes. In various embodiments, such age thresholds may be configurable. In some embodiments, re-occurring events, such as ongoing motion events, may cause a sensor node coupled to a sensor (e.g., a motion detector) to continually transmit (e.g., broadcast) sensor messages with updating timestamp data such that receiving listening nodes may repeatedly perform triggered responses.

In some embodiments, listening nodes may discard received sensor messages that have position data indicating a distance that exceeds a predefined distance threshold. In other words, listening nodes may determine whether sensor messages include x-axis, y-axis, and/or z-axis coordinates that indicate the sending sensor node was within or outside of a predefined distance threshold from the listening node. Such distance thresholds may be valuable for embodiments that utilize ad hoc networks. As a non-limiting illustration: if a first sensor message includes position data that indicates the sending sensor node is 10 feet away, a listening node may discard the sensor message when the distance threshold is 8 feet. As another example, if a second sensor message includes position data that indicates the sending sensor node is 5 feet away, the listening node may store the second sensor message when the distance threshold is 8 feet.

In various embodiments, listening nodes may store received sensor messages and related data in local memory (or other connected or internal storage). However, due to limited memory and storage, listening nodes may be configured to maintain (or store) a maximum number of received sensor messages. Accordingly, listening nodes may be configured to store within local memory up to a predefined maximum number of sensor messages and may periodically remove or discard stored sensor messages that have timestamps that exceed predefined age thresholds. For example, based on the size of available memory, a listening node may determine whether to discard a previously stored sensor message in favor of storing a newly received sensor message. In general, listening nodes may be configured to store newer sensor messages over old messages. For example, when a local memory is full, a listening node may replace the oldest stored sensor message with a newly received sensor message. Additionally, in some embodiments, lighting nodes may be configured to perform filtering or other cleanup operations to remove stored sensor messages that are too old. For example, based on routine evaluations of timestamp data associated with stored sensor messages, a lighting node may determine a particular stored sensor message has an age outside of a predefined age threshold and thus may delete or discard that particular stored sensor message, regardless of the available storage within local memory. In some embodiments, listening nodes may store sensor messages in lists sorted by age (i.e., timestamp of the sensor data within the sensor messages).

In some embodiments, an application programming interface (API) may be provided for obtaining statistics on the sensor messages stored on lighting nodes (e.g., in a linked list or queue). Data related to each lighting node may be queried and obtained by various parties and/or devices (e.g., lighting nodes themselves) using the API, such as the number of number of valid messages, the newest sensor data obtained, the oldest sensor data obtained, the mean age, median age, minimum (or min) age, maximum (or max) age, etc. for data stored at various lighting nodes. For example, when lighting nodes are configured to activate lights based on motion detection sensor messages, a plurality of motion events detected within a time period and/or area may be queried via the API so that the lights may be turned on in response to determining that the total number of motion events crossed a threshold. In this way, lighting nodes may be configured to perform lighting actions based on more than one event or sensor message. As another example, when ambient light sensor data is being exchanged between lighting nodes, the average of the sensor readings from multiple sensor nodes may be used by a listening node to control light levels based on the ambient light. Such averaging may reduce noise intrinsic to sensors and/or caused by outside influences (e.g., a bright light briefly pointed at a sensor, etc.).

In various embodiments, lighting nodes within the lighting sensory network may utilize various networking protocols to exchange data. In particular, sensor nodes may utilize broadcast UDP packets to distribute sensor data. When configured to utilize broadcast UDP packets, sensor nodes may be configured to send their sensor messages to a configurable UDP port (i.e., a destination port). Further, UDP packets may be broadcast over wired or wireless networks. Alternatively, sensor nodes may utilize broadcast messages via general purpose ad hoc networking radios (e.g., Bluetooth® 4.0, 802.15.4, etc.) to distribute sensor data. For 802.11 wireless networks, this may include both infrastructure access points (AP with stations) and ad hoc networks. In various embodiments, the various nodes of the lighting sensory network may utilize IP multicast techniques to transmit messages in between multiple disparate networks, such as between nodes of two local area networks on opposite sides of a city.

In various embodiments, assignments of lighting nodes to either group may be made by a coordinating server associated with the lighting sensory network. The coordinating server may be responsible for configuring and synchronizing the various nodes of the lighting sensory network, such as by transmitting configuration settings to individual lighting nodes. In other words, sensor nodes and listening nodes may not be self-organizing. For example, the coordinating server may transmit messages over a wide area network (or Internet) that cause a particular plurality of lighting nodes to enter sensor transmit modes (i.e., be configured to operate as sensor nodes), another plurality of listening nodes to enter listening modes (i.e., be configured to operate as listening nodes), as well as store communication settings related to the entire lighting sensory network (e.g., transmission ports, etc.) and/or settings related to individual nodes (e.g., retransmission intervals, etc.). In some embodiments, some lighting nodes within the lighting sensory network may not be assigned by the coordinating server to either a sensor node group or a listening node group at a given time.

In some embodiments, the lighting nodes may receive configuration settings, encryption keys (or decryption keys), and/or other parameters related to transmitting sensor messages via out-of-band messages from the coordinating server. In some embodiments, data from the coordinating server may indicate particular sensor node groups that a listening node may monitor and/or particular listing groups to which a sensor node may transmit. In some embodiments, various lighting nodes within the lighting sensory network (e.g., listening nodes or sensor nodes) may utilize clocks that are synchronized with a common clock signal or other synchronization information provided by the coordinating server. Such synchronization information may enable the nodes to keep a common time for timestamping purposes.

In various embodiments, the coordinating server may also assign position data (e.g., x-axis, y-axis, z-axis coordinates, etc.) to each node in the lighting sensory network. As indicated above, sensor nodes may place such position information within sensor messages so that listening nodes may determine their distance from sensor nodes. For example, based on a comparison of positions, a listening node in receipt of a sensor message may filter-out the sensor data from the sensor message as the sending sensor node is too far to provide relevant data to the listening node. In other words, position information may be used to enable listening nodes to only listen to transmissions (e.g., broadcasts) from sensor nodes within a certain range.

The various embodiments enable techniques for lighting nodes within a lighting sensory network to retransmit sensor data with transmission schedules that have randomized exponentially increasing retransmit intervals. These techniques both provide greater opportunities for listening nodes to receive missed data (e.g., due to congestion, etc.), but also intelligently limit the number of retransmissions to avoid inefficient network activity. Although conventional techniques for retransmitting data may exist (e.g., Ethernet communications, etc.), the embodiments provide beneficial techniques explicitly designed for use in lighting sensory networks, as opposed to cellular networks. The embodiment techniques are further beneficial in providing secure messaging via shared keys distributed and controlled by a coordinating server. With such a closed protocol that also scrutinizes sensor data age and distance, lighting nodes of embodiment lighting sensory networks may only participate in sensor data distributions when admitted by the coordinating server, thus providing security against spoofers and other attacks.

Various embodiments may utilize lighting sensory networks as described within United States Non-Provisional patent application entitled "Networked Lighting Infrastructure for Sensing Applications," application Ser. No. 14/024,561, filed Sep. 11, 2013 and its related U.S. Provisional Application No. 61/699,968, the contents of which are incorporated herein. In general, light sensory networks may utilize a network architecture that enables "plug-and-play" deployment of sensors at lighting nodes. When new sensors are deployed within infrastructures associated with such a network, software and hardware of a lighting node may manage the sensor. Typically, sensors require power, typically low voltage DC, and may generate analog or digital signals as output. The lighting sensory network may provide support for generic functions associated with the sensors, thereby eliminating the need for custom hardware and software support for sensors. The lighting sensory network may provide DC Power to sensors as required, as well as monitor the analog or digital interfaces associated with the sensors, as well as all other activities at the various nodes.

Lighting nodes (or lighting node platforms) may be deployed at individual street lamps or other lighting fixtures within installation sites (or lighting infrastructures), and may be coupled with gateway functionality for interfacing with backhaul networks (i.e., gateway nodes). Such gateway nodes may communicate with the Internet using well-known communications technology, such as cellular telephone, Wi-Fi, GSM, GPRS, or other means. The gateway nodes may provide interfaces to wide area networking (WAN) functionality and may provide complex data processing functionality, in addition to the functions provided by the lighting nodes. In general, lighting nodes and gateway nodes may be deployed within infrastructures associated with such a lighting sensory network, such as buildings, parking decks, etc. Accordingly, the primary entities involved in the lighting sensory network may include lighting infrastructure owners (e.g., a municipality, a building owner, tenants, a facility maintenance company, or other entities), application framework providers, application or application service owners, and end users.

Further, gateway nodes may interface with service platforms (or coordinating servers), thus enabling lighting nodes to provide data to, or receive instructions from, various applications maintained by the service platforms. Service platforms (or coordinating servers) may be implemented in the cloud to enable applications, such as applications provided by owners, partners, consumers, or other entities related to the lighting sensory network or infrastructures (e.g., parking decks, etc.) to enable desired functionality of the lighting sensory network. The applications may be usually developed by others and licensed to the infrastructure owner, but owners of lighting nodes may also provide applications. Typical lighting related applications may include lighting control, lighting maintenance, and energy management. There may also be partner applications, such as that have access to confidential data and to which the lighting infrastructure owners grant privileges. Such applications may provide security management, parking management, traffic reporting, environment reporting, asset management, logistics management, and retail analytics data management to name a few. There may also be consumer applications that enable consumers to have access to generic data, with access to this data granted, for example, by the infrastructure owner. Another type of applications may be owner-provided applications that are developed and used by infrastructure owners, such as applications for controlling traffic flow in a region or along a municipal street. Of course there may also be applications that use customized data from the framework.

FIG. 1 illustrates an exemplary architecture of an embodiment lighting sensory network 100 that may utilize devices and infrastructures based on lighting node, gateway node, and service platforms, architectures, or devices as described below. The light sensory network 100 may include various groups of lighting nodes 10 affixed to light poles 30 (or various other similar light fixtures) that may be configured to communicate with each other and with gateway nodes 50. As described above, in various embodiments, the lighting nodes 10 may be configured to behave as sensor nodes, listening nodes, both, or neither. The gateway nodes 50 may communicate through links 52 to communication media 55 (or devices) which may be connected via links 62 to the Internet 65. In other words, gateway nodes 50 may act as a network bridge to connect lighting nodes 10 with wide area networks and the Internet 65, thus creating connections to various service platforms 90 (e.g., coordinating servers). In various embodiments, the communication media 55 may utilize various communications technologies (e.g., global system for mobile communications or "GSM", general packet radio service or "GPRS", Wi-Fi®, other wide area network or "WAN" connections, etc.) to connect the various devices within lighting sensory network 100. Further, communication media 55 may utilize links 58 to exchange data with one another.

In a typical implementation as illustrated, the light sensory network 100 may include one or more local area networks 11, 22, 33 that each include one or more lighting nodes 10 and gateway nodes 50. Further, each local area network 11, 22, 33, via their respective gateway nodes 50, may be connected to different communication media 55 and may be commonly coupled together to the service platforms 90 available through the Internet 65. Within each local area network 11, 22, 33, the lighting nodes 10 and gateway nodes 50 may be connected via a data plane 135 to enable high local bandwidth traffic shown as local area network (LAN) communication media. These connections (or LAN network connections), for example, may enable the exchange of local video or logged data among these lighting node platforms (e.g., data may be exchanged between the lighting nodes 10 of the same local area network 11, 22, 33). In some embodiments, nodes 10, 50 may exchange messages with other nodes 10, 50 (e.g., nodes in other local area networks 11, 22, 33) using User Datagram Protocol (UDP) or IP Multicasting techniques. In some embodiments, the light sensory network 100 may include ad hoc networks in which various devices may be included and configured to communicate via wireless or wired protocols, such as Bluetooth®, ZigBee®, etc.

In various embodiments, the lighting nodes 10 may be platforms and light sources deployed at various locations in a lighting infrastructure (e.g., at individual street light fixtures within a parking deck or garage, etc.). At least some of the lighting nodes 10 within the light sensory network 100 may include sensors that collect and report data to other nodes, and in some cases, to higher levels in the architecture. For example, at the level of an individual lighting node 10, an ambient light sensor or camera sensor may provide information about lighting conditions or event occurring at the location of the lighting node 10. Lighting nodes 10 may further include sensors of various types, such as a daylight sensor, an occupancy sensor, etc. The lighting nodes 10 may include processor modules that execute node platform control and application software. Depending on the data processing required, there may be more than one processor module installed as part of an individual lighting node 10. The lighting nodes 10 may also include controllers for performing functions in response to the sensors, or performing functions in response to control signals received from other sources.

Figure 2:
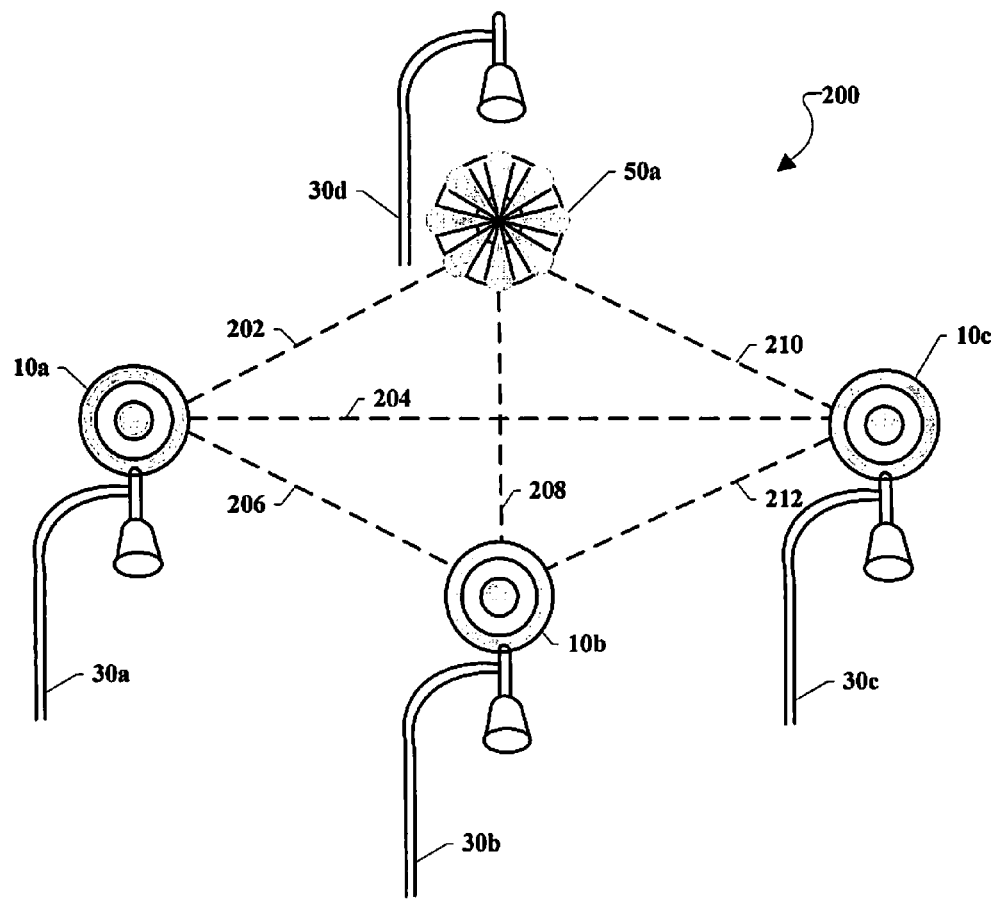
FIG. 2 is a diagram illustrating exemplary connections between nodes of a lighting sensory network suitable for use in various embodiments.

FIG. 2 illustrates exemplary connections between nodes of a lighting sensory network suitable for use in various embodiments. In various embodiments, the nodes of a local area network 200 may be connected via a control plane which connects all of the nodes to each other and provides transport for local and remote traffic, exchanging information about events, usage, node status, and enabling control commands from the gateway node 50a, and responses to the gateway node 50a from the lighting nodes 10a-10c. In some embodiments, the local area network 200 may include communication media that utilizes Wi-Fi®, 4G/LTE, ZigBee®, Bluetooth®, 802.15-based protocols, and/or other data communications technologies. For example, lighting nodes 10a-10c may include DASH7 sensors and/or readers to publish performance, sensor, usage, and/or application data.

In particular, the lighting nodes 10a-10c and the gateway node 50a may be within the local area network 200 associated with an installation site (e.g., a parking deck, etc.). A first lighting node 10a may be affixed to a first light pole 30a, a second lighting node 10b may be affixed to a second light pole 30b, a third lighting node 10c may be affixed to a third light pole 30c, and the gateway node 50a may be affixed to a fourth light pole 30d. In various embodiments, the nodes may be affixed or otherwise coupled to various types of poles, fixtures, or elements of the installation site (e.g., ceilings, floors, columns, etc.). Using various communication protocols and means (e.g., wireless or wired communication links), the various nodes may be configured to transmit messages (e.g., sensor messages that include sensor data, etc.) that may be received and processed by each other. In particular, the first lighting node 10a may exchange data via the wired or wireless links 202, 204, 206 with the gateway node 50a, the third lighting node 10c, and the second lighting node 10b, respectively. The second lighting node 10b may exchange data via the wired or wireless links 206, 208, 212 with the first lighting node 10a, the gateway node 50a, and the third lighting node 10c, respectively. The third lighting node 10c may exchange data via the wired or wireless links 204, 210, 212 with the first lighting node 10a, the gateway node 50a, and the second lighting node 10b, respectively.

Figure 3A:
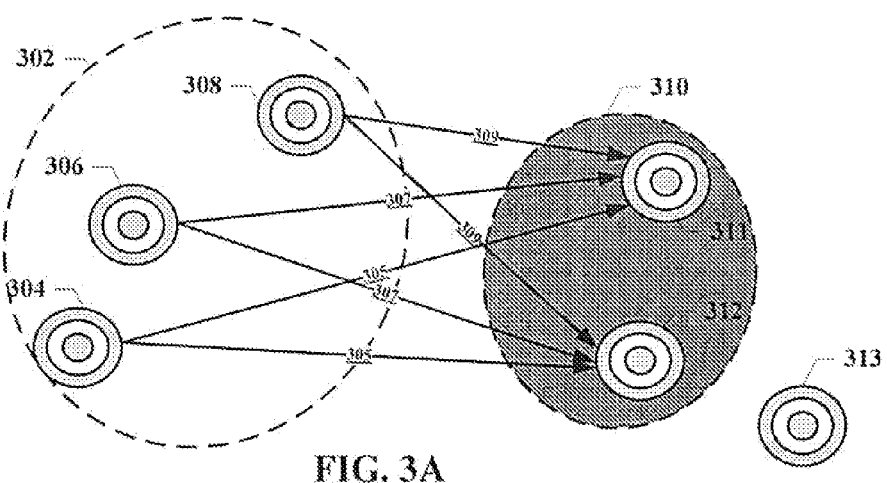
FIGS. 3A-3C are diagrams illustrating various groups of lighting nodes within a lighting sensory network suitable for use in various embodiments.
Figure 3B:
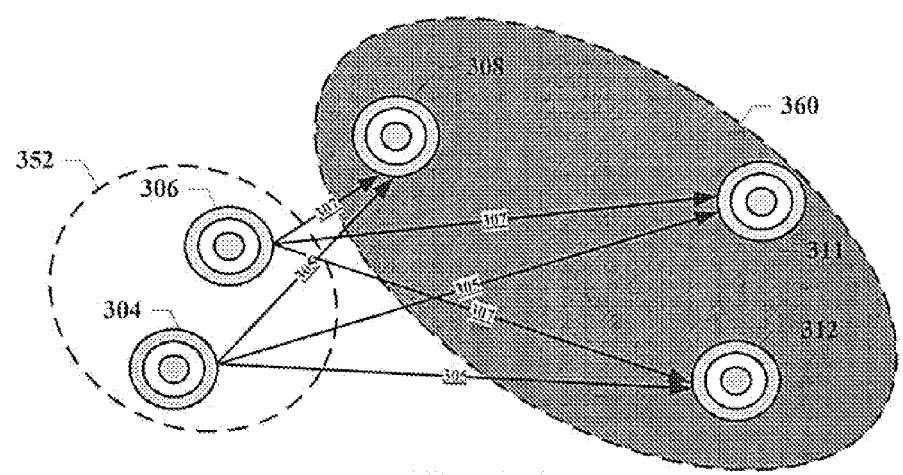
Figure 3C:
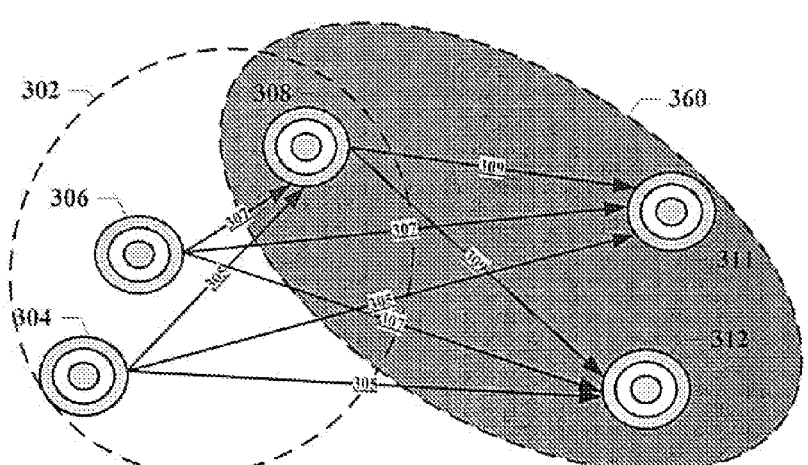

FIGS. 3A-3C illustrate various groups of lighting nodes within a lighting sensory network suitable for use in various embodiments. As described above, a coordinating server may identify particular lighting nodes within an installation site (e.g., parking deck) that may behave as sensor nodes and other lighting nodes that may behave as listening nodes. The sensor nodes may be configured to transmit sensor data (e.g., light sensor data, camera data, motion detector data, etc.) that may be received and processed by listening nodes. For example, a first lighting node configured to operate as a sensor node may broadcast a sensor message including ambient light sensor data (or light level sensor data), and a second lighting node configured to operate as a listening node may receive the sensor message and perform a routine based on the included ambient light sensor data. Within the installation site, lighting nodes may be configured to operate in groups of sensor nodes, groups of listening nodes, both, or neither.

FIG. 3A illustrates exemplary signaling between lighting nodes of a first listening node group 310 and a first sensor node group 302 within an installation site. The first sensor node group 302 may include various lighting nodes that have been provisioned by the coordinating server to behave as sensor nodes. For example, a first lighting node 304, a second light node 306, and a third lighting node 308 may be configured to operate in a sensor transmit mode and thus transmit various sensor data via sensor messages. In particular, the first lighting node 304 may transmit sensor messages via signals 305, the second lighting node 306 may transmit sensor messages via signals 307, and the third lighting node 308 may transmit sensor messages via signals 309. Such signals may be messages transmitted via various standards or protocols, such as Bluetooth®, Bluetooth® LE, ZigBee®, Wi-Fi®, UDP, IP Multicast, etc. The first listening node group 310 may include a fourth lighting node 311 and a fifth lighting node 312 configured to operate in a receiving mode and thus monitor for and receive sensor messages transmitted by the lighting nodes 304, 306, 308 of the sensor node group 302. A sixth lighting node 313 may not be within either the first listening node group 310 or the first sensor node group 302, and thus may not transmit nor receive any sensor messages.

FIG. 3B illustrates signaling between lighting nodes of a second listening node group 360 and a second sensor node group 352 within an installation site. The groups 352, 360 may be similar to the groups 302, 310 described above with reference to FIG. 3A, except that the second sensor node group 352 may include only the first lighting node 304 and the second lighting node 306 and the second listening node group 360 may include the third lighting node 308, fourth lighting node 311, and fifth lighting node 312. Unlike in FIG. 3A, the third lighting node 308 is not configured to transmit sensor messages, but instead is configured to receive the sensor messages from the first lighting node 304 and the second lighting node 306 via the signals 305 and 307, respectively. In other words, based on different messages from the coordinating server, lighting nodes may be configured to be listening nodes or sensor nodes at a given time.

Further, FIG. 3C illustrates that lighting nodes may be configured to simultaneously operate as both a listening node in the second listening node group 360 and a sensor node in the first sensor node group 302. In particular, based on messages from the coordinating server, the third lighting node 308 may be configured to receive signals from the first lighting node 304 and the second lighting node 306 via signals 305 and 307, respectively, as well as transmit sensor messages via signals 309 that may be received by the fourth lighting node 311 and the fifth lighting node 312.

Figure 4:
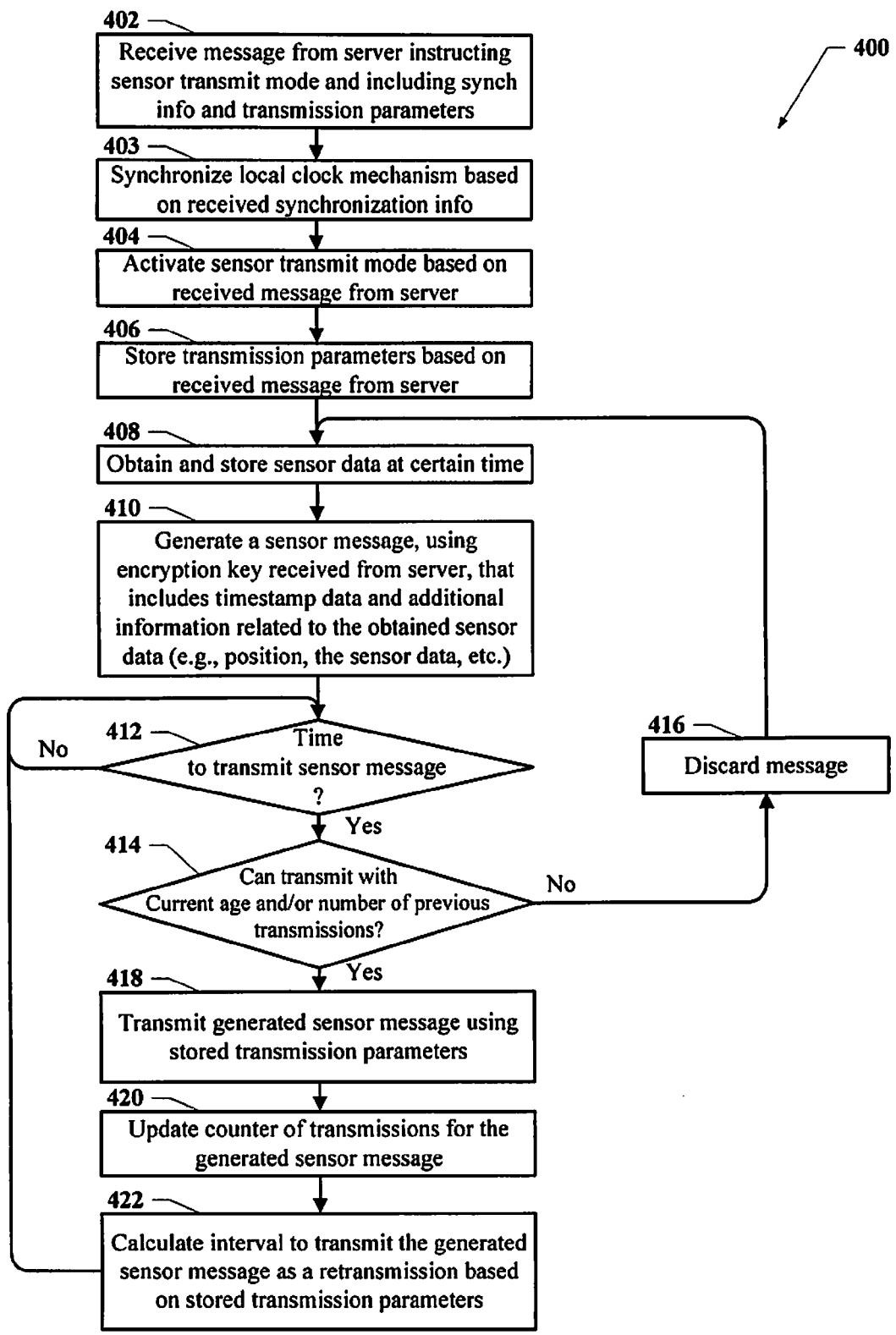
FIG. 4 is a process flow diagram illustrating an embodiment method for a lighting node to transmit sensor data for use by other nodes within a lighting sensory network.

FIG. 4 illustrates an embodiment method 400 for a lighting node to transmit sensor data for use by other nodes within a lighting sensory network. As described above, when configured to operate as a sensor node in a sensor node group within the lighting sensory network, the lighting node may be capable of periodically and repeatedly transmitting sensor messages for use by other lighting nodes. For example, based on sensor data within sensor messages broadcast by the lighting node, other nodes may be configured to dim their lights or perform other lighting actions related to the sensor data. The method 400 may be performed by any node within a lighting sensory network that is capable of transmitting sensor messages and that is coupled to or otherwise configured to access sensor data, such as motion sensor data or light sensor data. Further, it should be appreciated that lighting nodes in such a lighting sensory network may be configured to perform the method 400 concurrently with other operations, such as the method 700 for receiving sensor messages as described below with reference to FIG. 7. In other words, lighting nodes may be configured to operate as listening nodes, sensor nodes, or both at any given time.

In block 402, the processor of the lighting node may receive a message from a coordinating server instructing the lighting node to enter a sensor transmit mode and including synchronizing time information (or clock synchronization information) and transmission parameters. Such a message may include a code, flag, indicator, script, information, or other instructions that may be identified and performed by the lighting node. For example, the received message may include a command code that causes the lighting node to enter a transmitting operating mode. The sensor transmit mode may be a configuration or operating mode that enables the lighting node to actively gather or otherwise access sensor data via coupled sensors, internal sensors, or local storage and transmit the sensor data in sensor messages that may be received by other nodes within the lighting sensory network. In various embodiments, the received message may include metadata, header information, and/or other descriptive data or information that may be used by the lighting node to identify the instructions for entering (or exiting) an active sensor transmit mode.

The received message may include synchronization information, such as information that may be used by the lighting node to synchronize an internal clock or timer. In various embodiments, all the nodes in the lighting sensory network may include clocks that are synchronized to the same common clock (or clock signal), such as a common clock maintained at the coordinating server or a coordinate universal time standard/clock (e.g., UTC). Such clocks may be polled when generating timestamp information to be included within sensor messages at sensor nodes or when evaluating incoming sensor messages at listening nodes.

The received message may further include transmission parameters that may define the structure, content, and formatting of sensor messages to be transmitted, as well as the manner in which such sensor messages are transmitted by the lighting node. For example, the transmission parameters may indicate the type and/or amount of sensor data that may be included within any sensor messages broadcast by the lighting node. As another example, the transmission parameters may include the communication protocol, port, an encryption key for securing messages using a predetermined encryption algorithm (e.g., AES-128-CBC, etc.), timing schedule (or base interval), a number of times any particular sensor message may be retransmitted, and an age that indicates how old a previously transmitted sensor message must be before a retransmission of the sensor message can be transmitted (e.g., re-broadcast).

In some embodiments, the received message from the coordinating server may further include position information related to the lighting node. In particular, the position information may include coordinates of the lighting node within an installation site (e.g., a parking deck, etc.). For example, the position information included within the received message may include 3D coordinates for the lighting node (e.g., coordinates on x-axis, y-axis, and z-axis). Such position information may include global position information (e.g., GPS coordinates, etc.) or alternatively may be relative information related to the installation site of the lighting node or its local area network (e.g., coordinates within a parking deck, etc.).

In various embodiments, the received message from the coordinating server may be relayed to the lighting node via a gateway node as described throughout this disclosure. For example, a gateway node may receive the message from the coordinating server via a connection to the Internet, and as a result, may transmit the message to the lighting node via a local area network. In various embodiments, the received message may be encrypted or otherwise encoded so that only the lighting node may be capable of accessing the retransmission parameters or other data included within the received message.

In some embodiments, the lighting node may receive more than one message from the coordinating server such that the lighting node may be configured to be in an active sensor transmit mode for various types of sensor readings/measurements. For example, a first message from the coordinating server may cause the lighting node to enter a sensor transmit mode related to lighting sensor data that should be broadcast once every minute, and a second message from the coordinating server may cause the lighting node to enter another sensor transmit mode related to motion sensor data that should be broadcast whenever the motion sensor data indicates movement. In other words, the lighting node may be directed by the coordinating server to manage more than one transmission schedule for one or more sensor data types at a given time.

In block 403, the processor of the lighting node may synchronize a local clock mechanism based on the synchronization information from the received message from the server. For example, the lighting node may synch a clock or timer to match a common clock utilized by all nodes within the lighting sensory network.

In block 404, the processor of the lighting node may activate a sensor transmit mode based on the received message from the coordinating server. For example, the sensor transmit mode may be represented by a system variable stored within memory of the lighting node. In some embodiments, the activated sensor transmit mode may include initializing a routine, thread, operations, or application related to the gathering and transmission of sensor data. In various embodiments, the lighting node may be configured to manage more than one sensor transmit mode at a given time. In other words, based on messages from the coordinating server, the lighting node may manage various transmission schedules for transmitting different sensor data within a period of time. In various embodiments, the lighting node may be configured to perform a separate thread, routine, service, or software for each active transmit mode concurrently observed at the lighting node. In some embodiments, based on the received message, the lighting node may be configured to operate in the activated sensor transmit mode for a particular period of time, at the elapse of which, the lighting node may de-activate the receiving mode.

Figure 5:
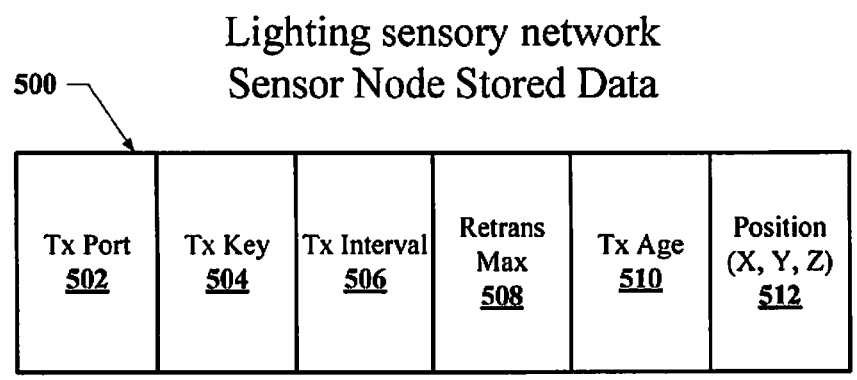
FIG. 5 is a block diagram of an exemplary data structure for information stored within a sensor node within a lighting sensory network suitable for use in various embodiments.

In block 406, the processor of the lighting node may store the transmission parameters based on the received message from the coordinating server. For example, the lighting node may store or update a data structure within local memory to include ports, transmission frequencies, encryption keys, and other data relevant to transmitting sensor data within sensor messages. FIG. 5 described below illustrates various data that may be received from the coordinating server and stored for use by the lighting node.

In block 408, the processor of the lighting node may obtain and store sensor data at a certain time, such as by querying coupled sensors for current measurements or readings that may be stored in a local storage, such as a database or memory location. The sensor data may include various types of information from various types of data collection or sensor units. For example, the obtained sensor data may be one or more of motion sensor data from a motion detector, imagery from a camera or video camera, sound data from a microphone, environmental data readings from various sensors (e.g., radon sensor, radiation sensor, carbon monoxide sensor, smoke detector, etc.), temperature measurements from a thermometer unit, light readings from a light sensor, etc. The lighting node may be configured to obtain the sensor data in a regular, periodic manner, such as every few seconds, etc. Further, the lighting node may be configured to obtain sensor data in response to the occurrence of an event, such as a motion event as detected by a motion detector. In various embodiments, the lighting node may record or otherwise store the time (or timestamp data) associated with the obtained sensor data. For example, the timestamp for obtained light sensor data may be stored along with the data for later use in comparisons with a current time.

In block 410, the processor of the lighting node may generate a sensor message that includes timestamp data and additional information related to the obtained sensor data (e.g., position, the sensor data, etc.). In particular, the sensor message may include sensor data, such as light sensor measurements or a binary motion detection indicator, obtained via the reading, polling, or measurement operations described above with reference to block 408.

The generated sensor message may also include a representation of the time (i.e., timestamp data) that the lighting node obtained the sensor data included within the sensor message. Such timestamp data may indicate the time of the event that caused the message to be generated, such as the time motion was detected by a motion sensor unit coupled to the lighting node. Thus, as the timestamp is related to the time of obtaining the sensor data, each time the generated sensor message with the obtained sensor data is transmitted, it may include the same timestamp data. In this way, the sensor message may indicate a single timestamp for the included sensor data regardless of how many or when the sensor message may be retransmitted (e.g., rebroadcast) in the future. In some embodiments, the generated sensor message may also include information related to the lighting node itself, such as identification information (e.g., serial number, group number, etc.) and location or position information (e.g., coordinates, location within the lighting sensor network or installation site, etc.) of the lighting node. Various information that may be stored within the sensor message are described below with reference to FIG. 6.

To ensure security within the lighting sensory network, the sensor message may be generated by the lighting node using the encryption key provided by the coordinating server via the received message described above. In particular, the lighting node may utilize the key with an encryption algorithm, such as AES-128-CBC, to generate the sensor message such that it may be difficult to decrypt or otherwise access without a corresponding decryption key. In some embodiments, the generated sensor message may include a cryptographically random number sent in plaintext and may be used as an initialization vector for AES-128-CBC.

To ensure reliable communication of sensor data, reduce congestion, and improve the robustness of messaging within the lighting sensory network, lighting nodes configured to operate in an active sensor transmit mode may retransmit sensor messages multiple times. Accordingly, in determination block 412, the processor of the lighting node may determine whether it is time to transmit the generated sensor message. For example, the lighting node may compare a pre-calculated interval (or next time to broadcast) to the current time to determine whether to re-broadcast the sensor message. In this way, the lighting node may only transmit sensor messages when they may be useful but not overly burdensome to process by the other lighting nodes of the lighting sensory network. Exemplary calculations for determining the interval for the next time to transmit are described below with reference to the operations in block 422. In various embodiments, the lighting node may determine it is time to transmit the generated sensor message when the sensor message has just been generated in response to newly received sensor data from a similar/same sensor or a new event has occurred. For example, in response to generating the sensor message when new or distinct motion detection sensor data from a motion detector or more current sensor data from a light sensor is obtained, the lighting node may determine it is time to transmit the generated sensor message (i.e., restart the retransmission interval/schedule).

In response to the lighting node determining that it is not time to transmit the generated sensor message (i.e., determination block 412="No"), the lighting node may continue to evaluate the time compared to the current transmission interval for the generated sensor message with the operations in determination block 412. However, in response to the lighting node determining that it is time to transmit the generated sensor message (i.e., determination block 412="Yes"), in determination block 414, the processor of the lighting node may determine whether the generated sensor message can be transmitted based on its current age and/or number of previous transmissions. In other words, the lighting node may determine whether the sensor message is too old and/or has already been transmitted a maximum number of times to retransmit again. The lighting node may evaluate stored information related to the generated sensor message indicating the number of retransmissions that have already occurred and/or the timestamp related to obtaining the sensor data of the generated sensor message. In some embodiments, the lighting node may utilize predetermined time thresholds received from the coordinating server via the message received with the operations in block 402. For example, the lighting node may compare the current time to the stored time for polling a light sensor to determine whether the time that has elapsed since polling a light sensor exceeds a predetermined age threshold set by the coordinating server. In some embodiments, the lighting node may compare the number of previous retransmissions of the generated sensor message to a predetermined maximum number. For example, the lighting node may evaluate a maximum retransmission value stored with the transmission parameters in local memory to a counter that increases each time the generated sensor message is transmitted by the lighting node. In response to the lighting node determining the generated sensor message cannot be retransmitted due to age or the previous number of transmissions (i.e., determination block 414="No"), in block 416 the processor of the lighting node may discard the generated sensor message and continue with the operations in block 408 for obtaining new sensor data for use in generating subsequent sensor messages.

In response to the lighting node determining the generated sensor message can be retransmitted due to age or the previous number of transmissions (i.e., determination block 414="Yes"), in block 418, the processor of the lighting node may transmit the generated sensor message using the stored transmission parameters, such as by using a port indicated by the coordinating server. For example, the lighting node may utilize a communication protocol (e.g., UDP protocol, Bluetooth®, ZigBee®, Bluetooth® Low Energy, Wi-Fi®, IP Multicast, etc.) to transmit a secured packet including at least the lighting node's identifier and the obtained sensor data. As described above, other lighting nodes within the lighting sensory network that are configured to be in listening node groups by the coordinating server may be capable of receiving the transmitted sensor message, such as by listening on a predefined UDP port, etc.

In block 420, the processor of the lighting node may update a counter for transmissions of the generated sensor message, such as by incrementing (or decrementing) a value stored within a variable that indicates the total number of times the lighting node has transmitted the generated sensor message. Such counters may be used for counting up (or counting down) to limit the total number of times any particular sensor message is transmitted, thereby improving congestion and avoiding unnecessarily redundant operations at the lighting nodes of the lighting sensory network. For example, the lighting node may decrement a counter for the total number of times the lighting node may broadcast a certain light sensor data message, such that when the counter reaches a zero value, the lighting node may not retransmit that light sensor data message again. As another example, the lighting node may increment a counter related to a motion sensor detector message such that when the counter value reaches a predetermined maximum value, the lighting node may stop retransmitting the motion sensor data in that motion sensor detector message.

With each transmission of the generated sensor message, in block 422, the processor of the lighting node may calculate an interval (or a next time) to transmit the generated sensor message as a retransmission based on the stored transmission parameters, such as using the base transmission interval provided by the server. In general, the lighting node may adjust the time period or interval in between retransmissions of the generated sensor message to increase over time so that the generated sensor message becomes less frequently transmitted. In particular, sensor messages may be retransmitted with a randomized, exponentially-increasing retransmit interval. The lighting node may adjust a base retransmit interval (e.g., default 500 ms in between retransmissions) exponentially over time so that the maximum possible interval may increase up to $2^N$ times the base retransmit interval after N retransmissions (e.g., N may be 8 retransmission by default). In some embodiments, the lighting node may utilize the following equation to calculate a retransmit interval (or schedule) for retransmitting the generated sensor message:

$$\text{Interval (or delay) between transmissions} = B * 2^n * \text{random}(\ ),$$

Where B may be a base retransmission interval, n may be a number of retransmissions for this sensor message (or event) or a default number (N), whichever is less, and random( ) may be a function that may return a random number between 0 and 1. In various embodiments, the lighting node may adjust stored information indicating the time to retransmit the generated sensor message, or alternatively may calculate on-the-fly whether the lighting node is to retransmit at a given time within the operations of determination block 412. In response to performing the operations in block 422, the lighting node may continue with the operations in determination block 412.

FIG. 5 illustrates an exemplary data structure 500 for information stored within a sensor node within a lighting sensory network. As described above, in response to receiving messages from a coordinating server related to the lighting sensory network (e.g., a service platform computing device), the sensor node may be associated with a sensor node group and may store data that enables the sensor node to transmit sensor messages for receipt by listening nodes within the lighting sensory network. In particular, the sensor node may store within the data structure 500 transmit port data 502 (referred to as "Tx Port" in FIG. 5) that indicates the networking port, connection, frequency, setting, and/or channel the sensor node may utilize to transmit sensor messages. In some embodiments, the transmit port data 502 may be a destination port for broadcast UDP messages and may have a default value of '7945'. The sensor node may also store within the data structure 500 transmit key data 504 (referred to as "Tx Key" in FIG. 5) that may be utilized for encrypting messages transmitted (e.g., broadcast) from the sensor node and encoded as a base64 string. In some embodiments, the transmit key data 504 may have a default value of a random 16 bytes not disclosed. The sensor node may also store within the data structure 500 transmission interval data 506 (referred to as "Tx Interval" in FIG. 5) that indicates the base transmission interval for transmitting (e.g., broadcasting) sensor messages. For example, the transmission interval data 506 may indicate the amount of time the sensor node must wait in between broadcasting a particular sensor message. In some embodiments, the transmission interval data 506 may have a default value of 500 milliseconds (ms). The sensor node may also store within the data structure 500 retransmission maximum data (referred to as "Retrans max" in FIG. 5) that may indicate the maximum number of times the sensor node may transmit (e.g., broadcast) a particular sensor message. In some embodiments, the retransmission maximum data 508 may have a default value of 8 times (i.e., a certain message may only be transmitted 8 times) and further may be encoded as a hecidecimal number or other numerical scheme (e.g., 0x100). The sensor node may also store within the data structure 500 message age data 510 (referred to as "Tx Age" in FIG. 5) that indicates the minimum age a transmitted sensor message must be before a retransmission of the sensor message can be transmitted (e.g., broadcast). In some embodiments, the message age data 510 may have a default value of 25,000 milliseconds (ms). Further, the sensor node may also store within the data structure 500 position data 512 (referred to as "Position (X,Y,Z)" in FIG. 5) that may indicate the current coordinates for the sensor node within the network. As shown below, the position data 516 may be represented within sensor messages transmitted by the sensor node so that receiving listening nodes may find relative distances between themselves and the sensor node.

In various embodiments, some configuration values provided by the coordinating server may relate to an entire subsystem of lighting nodes (e.g., global configurations), while other configuration values may be individualized for particular lighting nodes operating as sensor nodes (e.g., specific node configurations). In particular, in various embodiments, transmission interval data 506, retransmission maximum data 508, message age data 510, and position data 512 may be specific to an individual lighting node.

Figure 6:
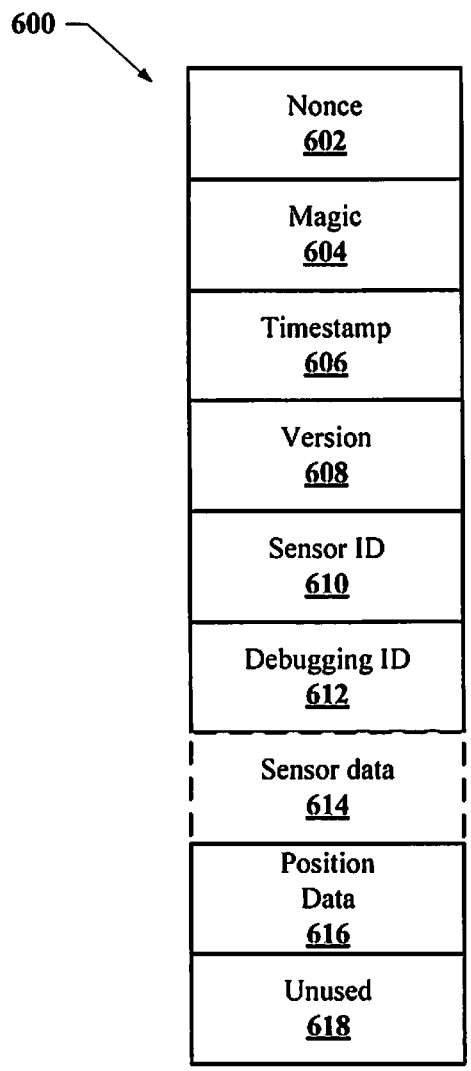
FIG. 6 is a block diagram of an exemplary structure for messages transmitted by nodes within a lighting sensory network suitable for use in various embodiments.

FIG. 6 illustrates an exemplary structure of a sensor message 600 that may be transmitted by lighting nodes within a lighting sensory network. The sensor message 600 may be a formatted message that is transmitted via a wireless or wired connection from a first lighting node to other lighting nodes with the network. For example, the sensor message 600 may be formatted for transmission via a Bluetooth®, ZigBee®, or a UDP protocol. In various embodiments, some or all of the sensor message 600 may be encrypted with AES-128-CBC using a shared key provided by the coordinating server coordinating the lighting sensory network. For example, a sensor node may use an encryption key to encrypt the sensor message 600 and a listening node may use a related decryption key to decrypt and access the data in the sensor message 600. In various embodiments, numeric values represented within the sensor message 600 may be in network byte order. In various embodiments, the size of the sensor message 600 may be 48-bytes.

The sensor message 600 may include various data that may be accessed by other authorized lighting nodes within the lighting sensory network. The sensor message 600 may be encrypted or otherwise unavailable to lighting nodes that are not valid/registered/authorized participants within the lighting sensor network (i.e., in communication with a coordinating server coordinating the network). The sensor message 600 may include nonce data 602 (e.g., a 16-byte format "number used once") that may be a cryptographically random number. The nonce data 602 may be used as an initialization vector for an encryption (e.g., AES-128-CBC), and further may be the only content of the sensor message 600 that is broadcast as plaintext. By using encryption algorithms and techniques, such as AES-128-CBC, security of the sensor message 600 is ensured as only lighting nodes that have acquired encryption keys and/or decryption keys form the coordinating server coordinating the lighting sensory network may access the information within the sensor message 600.

The sensor message 600 may also include "magic" data 604 that may be formatted as an unsigned 32-bit integer ("uint32") and may have a value of 0x53454e53 ("SENS"). The magic data 604 (or magic number) may serve to indicate that the sensor message 600 is correctly formatted after decryption. If the decryption key is incorrect, then the magic data 604 (or magic number) may not have the correct value, and therefore the sensor message 600 may be discarded. The sensor message 600 may also include timestamp data 606 that may be formatted as an unsigned 32-bit integer ("uint32") and may represent a time in milliseconds. For example, the timestamp data 606 may be the lower-32 bits of milliseconds since the start of a period (or epoch) measured via a coordinated universal time (e.g., UTC), and may be represented as an unsigned 64-bit integer.

The sensor message 600 may also include various other data, such as version data 608 that may be an unsigned 8-bit integer ("uint8") that indicates a protocol version used by a lighting node to generate and/or format the sensor message 600, sensor identifier data 610 (or sensor ID) that may be an unsigned 8-bit integer ("uint8") that identifies the lighting node or sensor unit related to the sensor message 600, debugging identifier data 612 (or debugging ID) that may be an unsigned 16-bit integer ("uint16") that indicates a lighting node identifier (e.g., a low 2-bytes of a lighting node's media access control (MAC) address) and that may be used for debugging purposes, position data 616 that may include three unsigned 16-bit integers ("uint16") that represent the X, Y, and Z axis coordinates of a lighting node in a virtual grid (e.g., the x-axis position, y-axis position, and z-axis position of the node transmitting the sensor message 600), and an used data 618 that may be several bytes in size (e.g., 10-bytes), set to a null or 0 value, and included within the sensor message 600 to pad or otherwise accomplish a predetermined message size (e.g., 48 bytes). Further, the sensor message 600 may optionally include sensor data 614, such as data indicating light sensor measurements, etc. The sensor data 614 may be an unsigned 32-bit integer ("uint32") and may be optional when measurements, readings, or other descriptive information is not needed to convey an event or sensor occurrence. For example, sensor data 614 related to some sensors (e.g., motion detectors) may be irrelevant, as the sensor data 614 may merely be needed to indicate that an event has occurred in a binary fashion (e.g., a motion event was detected).

Figure 7:
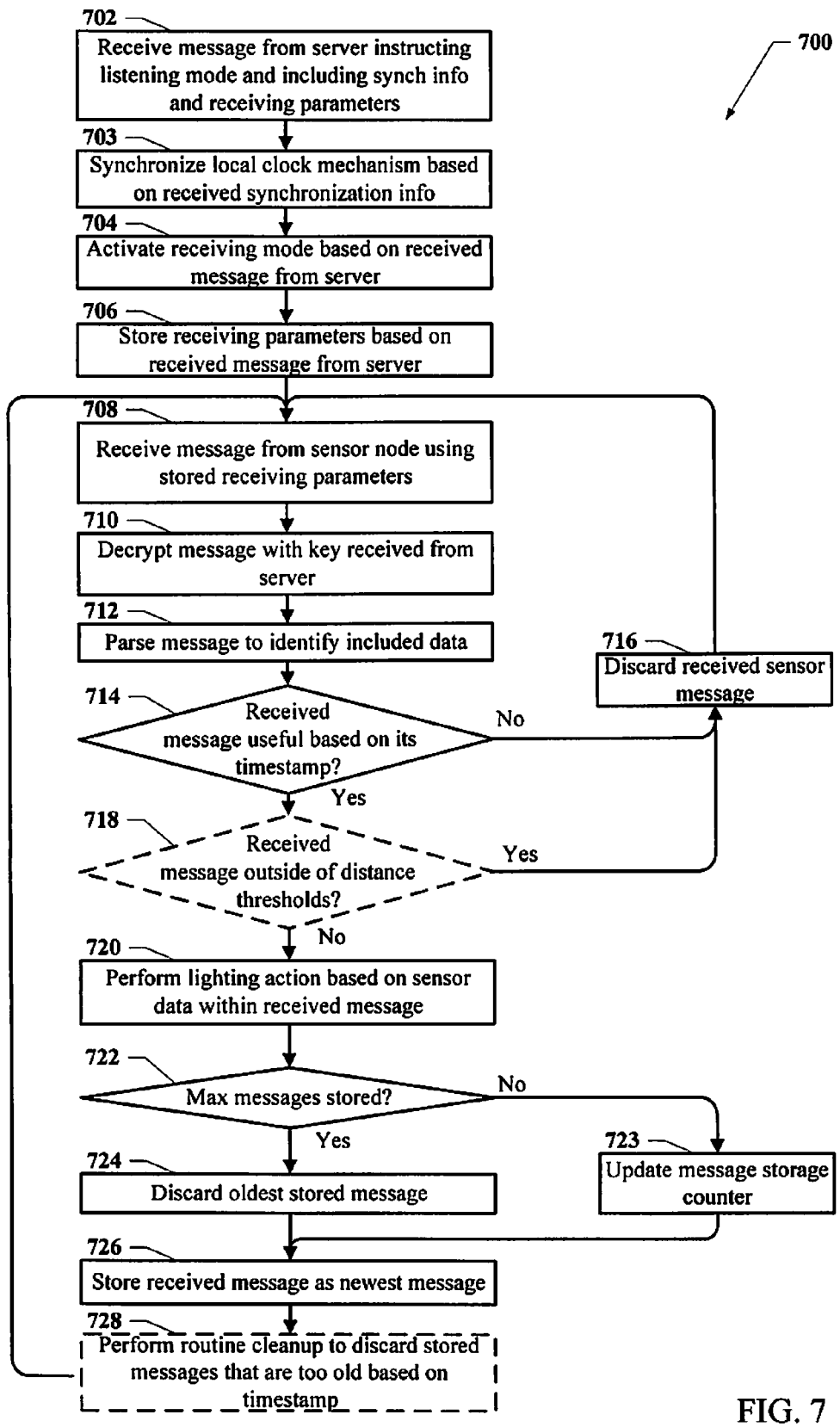
FIG. 7 is a process flow diagram illustrating an embodiment method for a lighting node to receive sensor data from other nodes within a lighting sensory network.

FIG. 7 is a process flow diagram illustrating an embodiment method 700 for a lighting node to receive data within sensor messages from other nodes within a lighting sensory network. As described above, when configured to operate as a listening node in a listening node group within the lighting sensory network, the lighting node may be capable of receiving and processing sensor messages transmitted by sensor nodes. For example, based on sensor data within a sensor message received from a sensor node, the lighting node may be capable of identifying and performing actions related to the received sensor data. It should be appreciated that lighting nodes in such a lighting sensory network may be configured to perform the method 700 concurrently with other operations, such as the method 400 for transmitting sensor messages as described above with reference to FIG. 4. In other words, lighting nodes may be configured to operate as listening nodes, sensor nodes, or both at any given time.

In block 702, the processor of the lighting node may receive a message from a coordinating server instructing the lighting node to enter a listening mode and that includes synchronization information and receiving parameters. The operations in block 702 may be similar to the operations in block 402 as described above with reference to FIG. 4, except the mode may be for receiving instead of transmitting and the receiving parameters may include data used by the lighting node for accessing and/or ignoring incoming sensor messages. Such receiving parameters may be stored locally at the lighting node, and may include information as described below with reference to FIG. 8. For example, the receiving parameters may include data that indicates receiving ports, maximum age thresholds for determining whether to evaluate incoming sensor messages, as well as decryption keys for decrypting those incoming sensor messages.

Similar to as described above with reference to block 403 in FIG. 4, in block 703, the processor of the lighting node may synchronize a local clock mechanism based on the synchronization information from the received message from the server. For example, the lighting node may synch a clock or timer to match a common clock utilized by all nodes within the lighting sensory network.

In block 704, the processor of the lighting node may activate a receiving mode based on the received message from the coordinating server. For example, the receiving mode may be represented by a system variable stored within memory of the lighting node. In some embodiments, the activated receiving mode may include initializing a routine, thread, operations, or application related to the monitoring for, reception, and processing of incoming sensor messages. In various embodiments, the lighting node may be configured to manage more than one receiving mode at a given time. In other words, based on messages from the coordinating server, the lighting node may manage various incoming ports for receiving different sensor data from various nodes within the lighting sensory network. In various embodiments, the lighting node may be configured to perform a separate thread, routine, service, or software for each active receiving mode concurrently observed at the lighting node. In some embodiments, based on the received message, the lighting node may be configured to operate in the activated receiving mode for a particular period of time, at the elapse of which, the lighting node may de-activate the receiving mode.

In block 706, the processor of the lighting node may store the receiving parameters based on the received message from the coordinating server. For example, the lighting node may store or update a data structure within local memory to include ports, transmission frequencies, decryption keys, and other data relevant to receiving and processing sensor messages.

In block 708, the processor of the lighting node may receive a sensor message from a lighting node within the lighting sensory network using the stored receiving parameters, such as by monitoring on a receive port indicated in the receiving parameters. For example, the lighting node may monitor a receive port to receive incoming messages that include sensor data, such as light sensor data or other data indicating a motion event has occurred at another lighting node configured to operate as a sensor node. In block 710, the processor of the lighting node may decrypt the received sensor message with the decryption key received from the coordinating server, and in block 712, may parse the decrypted message to identify included data, such as sensor data, the identity of the sending lighting node, and/or any other data within the message such as described above with reference to FIG. 6.

In determination block 714, the processor of the lighting node may determine whether the received sensor message is useful (or otherwise acceptable) based on its timestamp. In other words, based on age threshold values received from the coordinating server and stored within the receiving parameters, the lighting node may determine whether the timestamp data of the received sensor message indicates the message should be used or ignored. For example, the lighting node may compare timestamp data from the received sensor message to a current synchronized clock to determine the amount of time that has elapsed since the sensor data was originally obtained by a transmitting sensor node, and may then determine whether the elapsed time is within a predetermined age threshold. In various embodiments, based on timestamp data, the lighting node may determine whether the received message is too old or alternatively indicates it is from a time too far in the future. For example, when the timestamp data of a received message indicates it includes sensor data obtained by a sensor node a week in the future, the lighting node may not use that received message as it may be fraudulent or otherwise erroneous.

In response to determining the received sensor message is not useful based on its timestamp (i.e., determination block 714="No"), in block 716, the processor of the lighting node may discard the received sensor message, such as by setting associated memory to be overwritten or otherwise removing the sensor message from a buffer or other temporary storage structure within the lighting node. The lighting node may continue with the operations for receiving subsequent sensor messages in block 708.

However, in response to determining the received sensor message is useful based on its timestamp (i.e., determination block 714="Yes"), in optional determination block 718, the processor of the lighting node may determine whether the received sensor message is outside of predetermined distance thresholds. Similar to the age thresholds described above, the lighting node may utilize distance thresholds based on data received in the receiving parameters. The lighting node may identify position information (e.g., x, y, z coordinates) related to the sensor node that transmitted the received sensor message, and may calculate a distance using that identified position information and its own stored position information. The lighting node may then compare the calculated distance to the distance thresholds indicated in the stored receiving parameters to determine whether the sensor node that transmitted the received sensor message is too far to be considered relevant to the lighting node. The distance calculation and comparison to predetermined thresholds may be done on a three-dimensional basis (i.e., utilizing x, y, and z coordinates), or alternatively may be done on a single-axis or multi-axis specific basis. For example, the lighting node may compare a distance that corresponds to only z-axis coordinates (e.g., a depth) and/or a distance that corresponds to both x-axis and y-axis coordinates (e.g., horizontal and vertical distance). In various embodiments, the operations in optional determination block 718 may be performed when the receiving parameters indicate distance comparisons are enabled for the lighting node (i.e., a "distance-enabled" value is set to "on" or "true", etc.). In response to determining that the received sensor message is outside of the predetermined distance thresholds of the receiving parameters (i.e., optional determination block 718="Yes"), the lighting node may discard the received sensor message in block 716 and continue receiving subsequent sensor messages in block 708.

In response to determining that the received sensor message is not outside of the predetermined distance thresholds of the receiving parameters (i.e., optional determination block 718="No"), in block 720 the processor of the lighting node may perform a lighting action based on the sensor data within the received message. Lighting actions may include operations related to light sources coupled to the lighting node, such as dimming a light source, intensifying the light source, deactivating the light source, and activating the light source. For example, the lighting node may dim (or decrease a brightness) of an attached light source (e.g., light bulb, LED, etc.) based on temperature sensor data within the received sensor message. As another example, the lighting node may energize a coupled light bulb when the sensor message includes data indicating a motion event occurred. In some embodiments, the lighting node may utilize distance information calculated based on the position information within the received sensor message and its own position to determine how to perform lighting actions. For example, the lighting node may dim an attached light a certain amount using a distance function when the received sensor message indicates a temperature sensor data (e.g., the attached light may be dimmed less when the calculated distance is smaller, etc.).

In determination block 722, the processor of the lighting node may determine whether a maximum number of messages are stored. In other words, due to memory or other storage limitations, the lighting node may evaluate whether the received sensor message may be stored without performing any clean-up operations corresponding to older stored messages. In particular, when the number of messages currently stored on the lighting node has reached a predetermined limit, the lighting node may delete or otherwise discard the oldest stored message to provide storage space for the received sensor message. In various embodiments, the maximum number of messages that may be stored in the lighting node may be defined by the received parameters received from the coordinating server or alternatively may be a number calculated by finding the number of messages of a particular size (e.g., 48 bytes) that may fit in a pre-allocated size of the memory or storage of the lighting node. In response to determining the maximum number of messages has not been stored (i.e., determination block 722="No"), in block 723 the processor of the lighting node may update a message storage counter, such as by incrementing by a value of one, and may continue with the operations in block 726.

In response to determining the maximum number of messages has been stored (i.e., determination block 722="Yes"), in block 724 the processor of the lighting node may discard the oldest stored message. The oldest message may be a sensor message with the oldest timestamp data, and may not necessarily be the sensor message that was the earliest received by the lighting node. For example, when a first message with a first timestamp indicating 2:00 PM is received by the lighting node at a first time and a second message with a second timestamp indicating 1:00 PM is received by the lighting node at a second time, the lighting node may determine that the second message is the oldest message as it includes timestamp data that predated the timestamp of the first message. In block 726, the processor of the lighting node may store the received sensor message as the newest message. The lighting node may utilize various data structures for storing the messages, such as a linked list or queue, that may be capable of keeping the stored messages in order of age. For example, the lighting node may maintain a sorted linked list or sorted queue data structure that keeps the sensor messages with the oldest timestamp data in the front and the sensor messages with the newest timestamp data in the back.

In optional block 728, the processor of the lighting node may perform routine cleanup to discard stored messages that are too old based on timestamp data. In other words, on a routine basis and regardless of the number of messages stored locally, the lighting node may be configured to discard or otherwise delete sensor messages that have been stored past a predefined maximum time period and/or with timestamp data that exceeds a maximum age threshold. The lighting node may continue with the operations in block 708 for receiving subsequent sensor messages.

FIG. 8 illustrates an exemplary data structure 800 for information stored within a listening node within a lighting sensory network. As described above, in response to receiving messages from a coordinating server related to the lighting sensory network (e.g., a service platform computing device), the listening node may be associated with a listening node group and may store data that enables the listening node to receive and process appropriate sensor messages from sensor nodes also within the lighting sensory network. In particular, the listening node may store within the data structure 800 receive port data 802 (referred to as "Rx Port" in FIG. 8) that indicates the networking port, connection, frequency, setting, and/or channel the listening node may utilize to monitor for and receive sensor messages. In some embodiments, the receive port data 802 may be a destination port for broadcast UDP messages and may have a default value of 7945. In some embodiments, the receive port data 802 may have a default value of '7945'. The listening node may also store within the data structure 800 receive key data 804 (referred to as "Rx Key" in FIG. 8) that may utilized for decrypting messages received from sensor nodes within the network and encoded as a base64 string. In some embodiments, the receive key data 804 may have a default value of a random 16 bytes not disclosed. The listening node may also store within the data structure 800 message maximum data 806 (referred to as "Msg max" in FIG. 8) that indicates the maximum number of received messages from sensor nodes within the network that may be stored at the listening node at any given time. In some embodiments, the message maximum data 806 may have a default value of 16 messages. The listening node may also store within the data structure 800 message age data 808 (referred to as "Msg Age" in FIG. 8) that indicates an age limit or threshold value for determining whether a received messages is still valid or otherwise useful to the listening node. The message age data 808 may be used by the listening node to evaluate timestamp information within received messages and determine whether the timestamps are within an acceptable tolerance of the current time. In some embodiments, the message age data 808 may have a default value of 30,000 milliseconds (ms). The listening node may also store within the data structure 800 distance checking data 810 (referred to as "Distance-enabled" in FIG. 8) that indicates whether the listening node should perform operations to evaluate incoming messages from sensor nodes using predetermined distance threshold values. The distance checking data 810 may be a flag, Boolean, or other simple indicator (e.g., on/off, yes/no, enabled/disabled, true/false, etc.). In some embodiments, the distance checking data 810 may have a default value of 'disabled' or 'false' (i.e., received messages are not checked based on distance values by default). The listening node may also store within the data structure 800 maximum X-Y axis distance data 812 (referred to as "Max Distance" in FIG. 8) that may indicate a maximum distance threshold value for evaluating incoming messages based on the sender's distance to the listening node on the x-axis and y-axis. In other words, the maximum X-Y axis distance data 812 may be used to determine whether an incoming message was originated from a node that is too far from the listening node on an X-Y axis coordinate system (e.g., height and lateral distances). The listening node may also store within the data structure 800 maximum Z axis distance data 814 (referred to as "Max Distance Z" in FIG. 8) that may indicate a maximum distance threshold value for evaluating incoming messages based on the sender's distance to the listening node on the z-axis. In other words, the maximum Z axis distance data 814 may be used to determine whether an incoming message was originated from a node that is too far from the listening node on a Z axis coordinate system (e.g., depth distance). In various embodiments, the default values for the maximum X-Y axis distance data 812 and the maximum Z axis distance data 814 may be zero when the listening node is not configured to evaluate distance with respect to received messages from sensor nodes (e.g., when the distance checking data 810 represent a 'false' or 'disabled' value). Further, the listening node may also store within the data structure 800 position data 816 (referred to as "Position (X,Y,Z)" in FIG. 8) that may indicate the current coordinates for the listening node within the network. The position data 816 may be used by the listening node to find relative distances between itself and sensor nodes corresponding to receiving messages.

In various embodiments, some configuration values provided by the coordinating server may relate to an entire subsystem of lighting nodes, while other configuration values may be individualized for particular lighting nodes operating as listening nodes. In particular, in various embodiments, message maximum data 806, message age data 808, distance checking data 810, maximum X-Y axis distance data 812, maximum Z axis distance data 814, and position data 816 may be specific to an individual lighting node.

FIG. 9 illustrates an exemplary pseudocode 900 that may be performed by listening nodes to handle incoming messages from sensor nodes within a lighting sensory network. The pseudocode 900 may represent operations similar to those described above with reference to FIG. 7. For example, the pseudocode 900 may include logic or programming for configuring for a listening node to perform operations for processing lighting sensor data, temperature data, and/or motion sensor data within Bluetooth® or UDP messages received from nearby sensor nodes within a parking garage network. The operations in the pseudocode 900 are meant for non-limiting illustration purposes only, and thus should not be considered to include code or particular operations relied upon by an embodiment of this disclosure.

Figure 10:
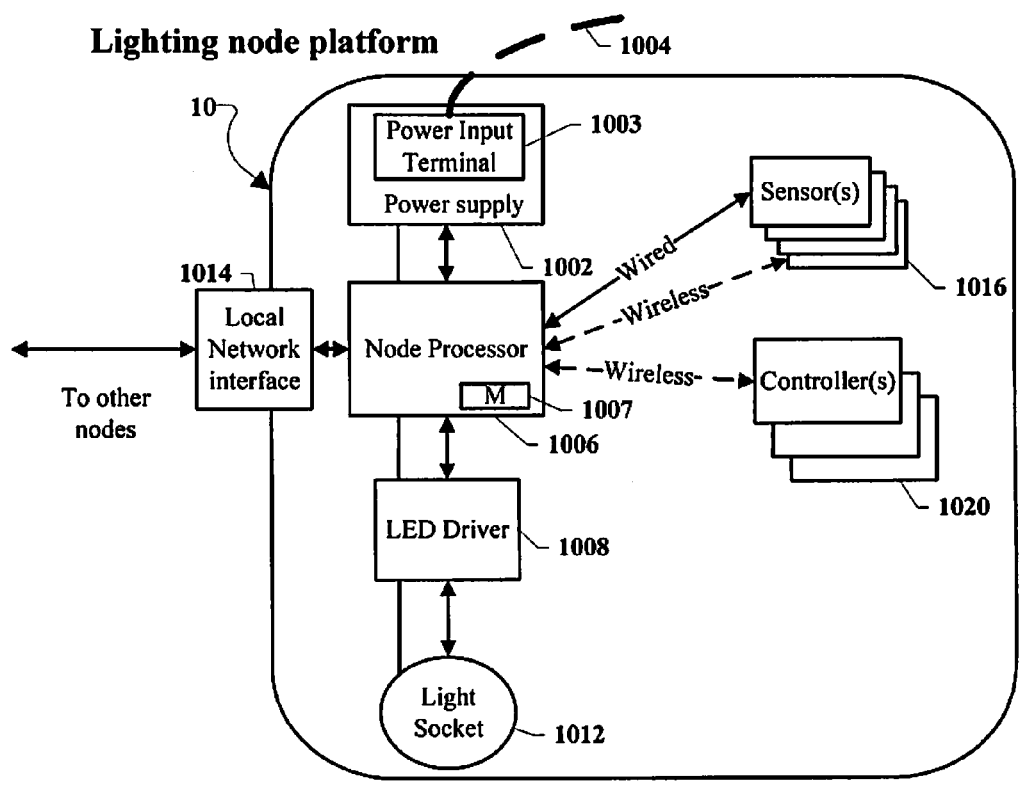
FIG. 10 is a component block diagram illustrating an exemplary lighting node platform suitable for use in various embodiments.

FIG. 10 illustrates a diagram of an embodiment lighting node 10 (or lighting node platform device). The lighting node 10 may at least include a luminaire light socket 1012 (i.e., a socket for a luminaire light source), a light emitting diode (LED) driver 1008, a node processor 1006, a local network interface 1014, and a power supply 1002. The node processor 1006 (or node controller) may be capable of running various logic, routines, instructions, software, and/or applications. For example, the node processor 1006 may execute instructions to coordinate the operations of sensors and controllers to implement a desired local functionality. In various embodiments, the node processor 1006 may be coupled to or include a memory 1007 (e.g., RAM) or other storage units. The node processor 1006 may also provide communication via an appropriate media, such as a local network interface 1014, to other lighting nodes. Application(s) executing via the node processor 1006 may be configured to drive or otherwise control the LED driver 1008 (or LED driver circuit) that is coupled to the light socket 1012 (e.g., a socket for a light source, bulb, etc.). Further, the node processor 1006 may manage all the functions within the lighting node 10. It also may implement the administrative, data collection and action instructions associated with various applications. These instructions may be delivered as application scripts to the node processor 1006. In addition, software executed by the node processor 1006 may provide activation, administration, security (authentication and access control) and communication functions.

In certain embodiments, the node processor 1006 may be coupled to an array of one or more controller(s) 1020 and/or an array of one or more sensor(s) 1016. The sensors 1016 associated with the lighting node 10 may be local to the lighting node 10, or they may be remote. The controllers 1020, other than the LED controller, may be hardware and/or software and further may be remote and use wireless communications. In some embodiments, the light socket 1012 may be operating under control of the one or more controllers 1020 within the lighting node 10. In various embodiments, the controllers 1020 may be software and/or hardware.

The lighting node 10 may also include a power supply 1002 (or power terminal block), typically implemented as an AC to DC converter along with components for measuring power, surge protection and power distribution. In some embodiments where lighting node platforms are deployed at outdoor street lamps, AC electrical power may be the primary power supply to such street lamps. Because most of the sensors and controller structures may use semiconductor-based components, the power supply 1002 may convert the available AC power to an appropriate DC power level for driving the various lighting node components. In some embodiments, the power supply 1002 may include and/or be coupled to a power input terminal 1003. In some embodiments, a pole wire 1004 may be connected to the power supply 1002, such as by connecting to the power input terminal 1003. The array of one or more sensors 1016 and/or the array of one or more controllers 1020 may be connected to the power supply 1002.

The local network interface 1014 may enable the lighting node 10 to communicate with a gateway platform device that is part of a local area network including one or more lighting node 10 and a gateway platform that enables the lighting node 10 to indirectly communicate with a wide area network (e.g., remote servers, other lighting networks, etc.). In various embodiments, the local network interface 1014 may include various radios, such as Bluetooth®, Wi-Fi®, WiFi Direct®, Bluetooth® Low Energy (BTLE), ZigBee®, RF, etc. that may enable the lighting node 10 to exchange wireless transmission with other nodes within a local area network. For example, the local network interface 1014 may be used to communicate with devices on an ad hoc network. Wired and wireless connections between the various components of the lighting node 10 may be provided as required in various alternative embodiments.

Figure 11:
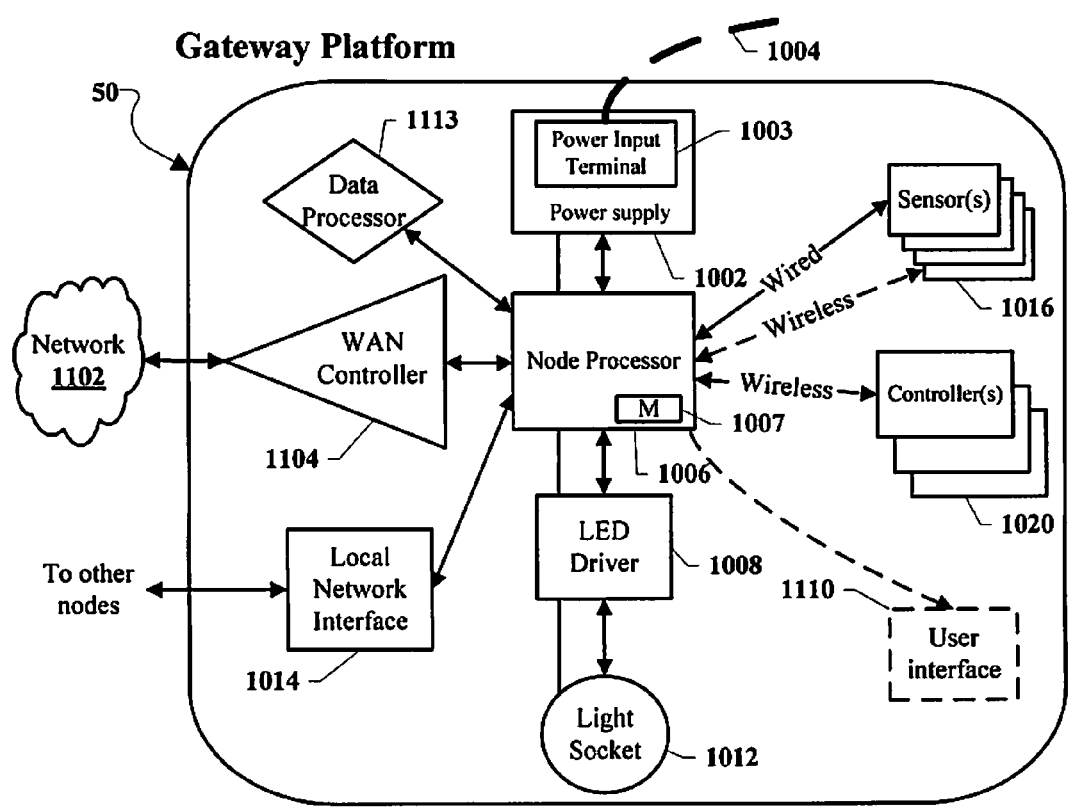
FIG. 11 is a component block diagram illustrating an exemplary gateway platform suitable for use in various embodiments.

FIG. 11 illustrates a diagram of an embodiment gateway node 50 (or gateway platform). As suggested by the figure, and mentioned above, in some embodiments, the gateway node 50 may be located at a lighting node platform or separately from the lighting node platforms. In other words, the gateway node 50 may be configured to include or otherwise utilize at least the resources of a lighting node platform (or lighting node device) as described above. Accordingly, the gateway node 50 may incorporate a power supply 1002, a node processor 1006 with a memory 1007, a local network interface 1014 for communications via a local area network (or LAN), an LED driver 1008 and a light socket 1012, as well as one or more sensors 1016 and one or more controllers 1020. The gateway node 50 may additionally include a wide area network (WAN) controller 1104 that may enable communications with a service platform or server (or coordinating server) via a WAN communication media or WAN network interface. For example, the gateway node 50 may exchange messages with the network 1102 via the WAN controller 1104. In some embodiments, a pole wire 1004 may be connected to a power input terminal 1003 that is coupled to or contained within the power supply 1002.

The gateway node 50 hardware and software components may enable high bandwidth data processing using a data processor 1113, such as processing when receiving/transmitting high video rates. These components may also enable WAN communications via the WAN controller 1104, in addition to the functions supported by lighting node platform as described above. As stated above, the gateway node 50 can be thought of as a lighting node platform, but with additional functions. Accordingly, the high bandwidth data processing via the data processor 1113 may support video and audio data processing functions that detect, record and report events (e.g., glass breaking, crowd formation, gun shots, etc.). The WAN functionality support via the WAN controller 1104 may be based on GSM, GPRS, Wi-Fi, LAN to Internet, or other wide area networking technologies. In some embodiments, the gateway node 50 may also include a user interface 1110, such as displays and/or input devices that may provide user access to data from lighting node platforms and/or service platforms associated with the gateway node 50.

Figure 12:
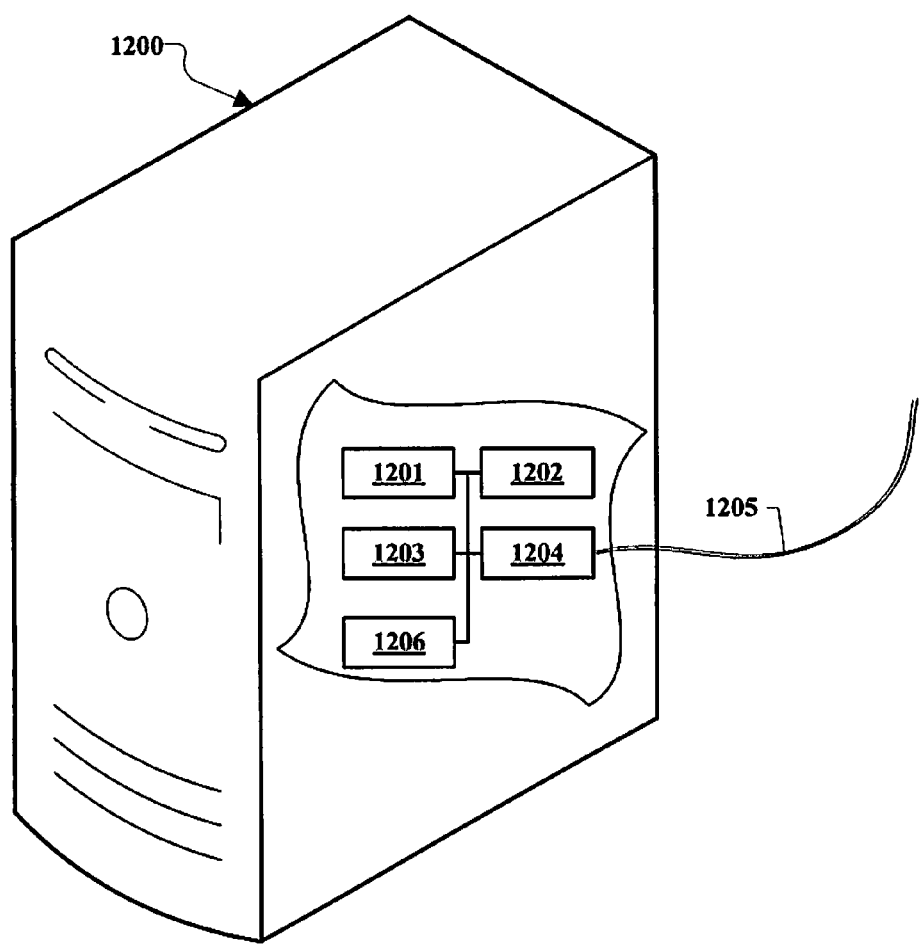
FIG. 12 is a component block diagram of an exemplary server computing device suitable for use in various embodiments.

The various embodiments may utilize any of a variety of commercially available server devices, such as the server computing device 1200 illustrated in FIG. 12. Such a server computing device 1200 may typically include a processor 1201 coupled to volatile memory 1202 and a large capacity nonvolatile memory, such as a disk drive 1203. The server computing device 1200 may also include a floppy disc drive, compact disc (CD) or DVD disc drive 1206 coupled to the processor 1201. The server computing device 1200 may also include network access ports 1204 and/or connections 1205 coupled to the processor 1201 for establishing data connections with a network, such as a local area network coupled to other system computers and servers or a wide area network.

In some embodiments, the processors as described in this disclosure may be any programmable microprocessor, microcomputer or multiple processor chip or chips that can be configured by software instructions (applications) to perform a variety of functions, including the functions of the various embodiments described above. In the various devices, multiple processors may be provided, such as one processor dedicated to wireless communication functions and one processor dedicated to running other applications. Typically, software applications may be stored in the internal memory before they are accessed and loaded into the processors. The processors may include internal memory sufficient to store the application software instructions. In many devices the internal memory may be a volatile or nonvolatile memory, such as flash memory, or a mixture of both. For the purposes of this description, a general reference to memory refers to memory accessible by the processors including internal memory or removable memory plugged into the various devices and memory within the processors.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Hardware that may be used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In various embodiments, the functions described may be implemented in hardware, software, firmware, or any combination thereof. If implemented in software, the functions may be stored on or transmitted over as one or more instructions or code on a non-transitory processor-readable, computer-readable, or server-readable medium or a non-transitory processor-readable storage medium. The steps of a method or algorithm disclosed herein may be embodied in a processor-executable software module or processor-executable software instructions which may reside on a non-transitory computer-readable storage medium, a non-transitory server-readable storage medium, and/or a non-transitory processor-readable storage medium. In various embodiments, such instructions may be stored processor-executable instructions or stored processor-executable software instructions. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory processor-readable storage medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for a lighting node within a lighting infrastructure to communicate data to other nodes within a lighting sensory network, comprising:
   receiving, at the lighting node, a first message from a server, instructing the lighting node to enter into a sensor transmit mode associated with a first type of sensor data, the first message including transmission parameters which includes an encryption key for transmitting secure sensor messages associated with the first type of sensor data to the other nodes and a retransmit base interval associated with the first type of sensor data;
   storing the transmission parameters for use by the lighting node;
   obtaining, at the lighting node, the first type of sensor data;
   recording a timestamp associated with a time the first type of sensor data was obtained;
   storing, at the lighting node, the obtained first type of sensor data and the recorded timestamp;
   generating, by the lighting node, an encrypted sensor message using the encryption key, the encrypted sensor message including the obtained first type of sensor data and the recorded timestamp; and
   transmitting, by the lighting node, the encrypted sensor message by broadcasting the encrypted sensor message to the other nodes which are configured to operate in a listening mode, at least some of the other nodes representing authorized listening nodes configured to decrypt the encrypted sensor message with a decryption key provided by the server to the authorized listening nodes that corresponds to the encryption key.

2. The method of claim 1, wherein the encryption key provided by the server to the lighting node and the decryption key provided by the server to the authorized listening nodes that corresponds to the encryption key represent symmetric keys that are generated using cryptography symmetric-key algorithms.

3. The method of claim 1, wherein the generated encrypted sensor message further includes one or more of nonce data, version data, sensor identifier data, debugging identifier data, the sensor data, and position data related to the lighting node.

4. The method of claim 1, wherein transmitting, by the lighting node, the encrypted sensor message by broadcasting the encrypted sensor message to the other nodes further comprises:
   broadcasting the encrypted sensor message to the other nodes with user datagram protocol (UDP) packets.

5. The method of claim 1, wherein the lighting sensory network is a wireless network from a group of wireless network types that includes at least an ad hoc wireless network.

6. The method of claim 1, further comprising determining, by the lighting node, whether to retransmit the generated encrypted sensor message based on at least one of a predefined age threshold and a number of previous transmissions of the generated sensor message.

7. The method of claim 6, further comprising discarding, by the lighting node, the generated sensor message in response to determining not to retransmit the generated encrypted sensor message based on at least one of the predefined age threshold and the number of previous transmissions of the generated sensor message.

8. A method for a lighting node within a lighting infrastructure to receive data from sensor nodes within a lighting sensory network, comprising:
   receiving, at the lighting node, a first message from a server instructing the lighting node to enter into a listening mode associated with a first type of sensor data, the first message including receiving parameters which includes a decryption key for decrypting sensor messages associated with the first type of sensor data received by the lighting node and a predefined age threshold, the decryption key is provided by the server to the lighting node and corresponds to an encryption key provided by the server to a sensor node;
   storing the receiving parameters for use by the lighting node;
   receiving, by the lighting node, an encrypted sensor message associated with the first type of sensor data from the sensor node within the lighting sensory network, the received encrypted sensor message including the first type of sensor data, identification information related to the sensor node, and a timestamp indicating when the first type of sensor data was obtained by the sensor node;
   decrypting, at the lighting node, the received encrypted sensor message with the decryption key;
   identifying, at the lighting node, from the decrypted sensor message the first type of sensor data, the identification information related to the sensor node, and the timestamp by parsing the decrypted sensor message;
   determining, by the lighting node, whether the decrypted sensor message is useful based on at least one of the timestamp from the decrypted sensor message and the predefined age threshold; and
   performing, by the lighting node, a lighting action based on the decrypted sensor message in response to determining the decrypted sensor message is useful.

9. The method of claim 8, wherein the lighting action includes at least one of dimming a light source, intensifying the light source, deactivating the light source, and activating the light source.

10. The method of claim 8, further comprising:
determining, by the lighting node, whether a maximum number of decrypted sensor messages are stored within a local memory;
discarding, by the lighting node, an oldest stored decrypted sensor message in response to determining that the maximum number of sensor messages are stored within the local memory; and
storing, by the lighting node, the decrypted sensor message in the local memory.

11. The method of claim 8, further comprising:
receiving, by the lighting node, a second encrypted sensor message associated with a second type of sensor data from a second sensor node within the lighting sensory network, the received second encrypted sensor message including the second type of sensor data, identification information related to the second sensor node, and a timestamp indicating when the second type of sensor data was obtained by the sensor node.

12. A method for communicating data within a lighting sensory network, comprising:
configuring a first plurality of lighting nodes to operate as sensor nodes that transmit messages associated with sensor data;
configuring a second plurality of lighting nodes to operate as listening nodes that receive the messages associated with the sensor data;
generating, by each of one or more of the first plurality of lighting nodes, an encrypted sensor message associated with a type of sensor data using an encryption key provided by a server to each of the one or more of the first plurality of lighting nodes, the generated encrypted sensor message includes at least a timestamp;
calculating, by each of the one or more of the first plurality of lighting nodes, an interval for retransmitting the generated sensor message, wherein the interval is randomized and recalculated by each of the one or more of the first plurality of lighting nodes after each retransmission of the generated sensor message to be exponentially increasing;
determining, by each of the one or more of the first plurality of lighting nodes, whether to transmit the generated encrypted sensor message based on the calculated interval;
transmitting, by each of the one or more of the first plurality of lighting nodes, the generated encrypted sensor message in response to determining to transmit the generated sensor message based on the calculated interval;
receiving, by one or more of the second plurality of lighting nodes, one or more of the generated encrypted sensor messages transmitted by the one or more of the first plurality of lighting nodes;
decrypting the one or more of the generated encrypted sensor messages received using one or more decrypting keys provided by the server to authorized lighting nodes from the second plurality of lighting nodes;
determining, by the one or more of the second plurality of lighting nodes, whether the received one or more of the sensor messages transmitted by the one or more of the first plurality of lighting nodes are useful based on timestamp data from the received one or more of the sensor messages and a predefined age threshold; and
performing, by the one or more of the second plurality of lighting nodes, one or more lighting actions in response to determining the received one or more of the sensor messages transmitted by the one or more of the first plurality of lighting nodes are useful.

13. The method of claim 1, further comprising:
retransmitting, by the lighting node, the encrypted sensor message periodically and repetitively after each broadcast of the encrypted sensor message for use by the other nodes until the lighting node determines the encrypted sensor message is no longer considered relevant to the other nodes.

14. The method of claim 13, further comprising:
determining new retransmission times for the generated sensor message using randomized exponentially increasing retransmit intervals that is based on and larger than the retransmit base interval.

15. The method of claim 14, further comprising:
recalculating the retransmit intervals after each retransmission of the generated sensor message so that the generated sensor message becomes less frequently retransmitted until the lighting node determines the encrypted sensor message is no longer considered relevant to the other nodes.

16. The method of claim 15, wherein the retransmit intervals increases up to $2^N$ times the retransmit base interval after N retransmissions.

17. The method of claim 1, wherein receiving the message at the lighting node from the server further comprises:
receiving, at the lighting node, a second message from the server, instructing the lighting node to enter into a sensor transmit mode associated with a second type of sensor data, the second message including transmission parameters which includes an encryption key for transmitting secure sensor messages associated with the second type of sensor data to the other nodes and a retransmit base interval associated with the second type of sensor data.

18. The method of claim 17, wherein the lighting node is configured to concurrently operate in the sensor transmit mode associated with the first type of sensor data and the sensor transmit mode associated with the second type of sensor data.

19. The method of claim 1, wherein receiving the message at the lighting node from the server further comprises:
receiving, at the lighting node, a third message from the server instructing the lighting node to enter into a listening mode associated with a third type of sensor data.

20. The method of claim 19, wherein the lighting node is configured to concurrently operate in the sensor transmit mode associated with the first type of sensor data and the listening mode associated with the third type of sensor data.

21. The method of claim 1, wherein obtaining, at the lighting node, the first type of sensor data and recording the timestamp further comprises:
obtaining the first type of sensor data in a regular, periodic manner or in response to an occurrence of an event detected by a sensor associated with the lighting node.

22. The message of claim 1, wherein the generated encrypted sensor message further includes identification information and position information of the lighting node.

23. The method of claim 11, wherein the lighting node is configured to concurrently operate in the listening mode associated with the first type of sensor data and the listening mode of the second type of sensor data.

* * * * *